United States Patent [19]

Kashihara et al.

[11] Patent Number: 4,840,247
[45] Date of Patent: Jun. 20, 1989

[54] DEVICE FOR CONTROLLING 4WD VEHICLE CENTRAL DIFFERENTIAL RESTRICTION DEVICE ACCORDING TO FRONT AND REAR WHEELS ROTATIONAL SPEED DIFFERENCE, AND METHOD OF OPERATION THEREOF

[75] Inventors: Yuji Kashihara; Yutaka Taga; Yasunari Nakamura; Hiroshi Ito; Tokuyuki Takahashi, all of Toyota, Japan

[73] Assignee: Toyota Jidosha Kabushiki Kaisha, Aichi, Japan

[21] Appl. No.: 44,309

[22] Filed: Apr. 30, 1987

[30] Foreign Application Priority Data

| May 6, 1986 [JP] | Japan | 61-105473 |
| May 6, 1986 [JP] | Japan | 61-105475 |
| Jun. 9, 1986 [JP] | Japan | 61-133065 |
| Jun. 30, 1986 [JP] | Japan | 61-153172 |
| Sep. 29, 1986 [JP] | Japan | 61-230543 |

[51] Int. Cl.$^4$ ............................................. B60K 17/34
[52] U.S. Cl. ..................................... 180/249; 180/197
[58] Field of Search ............... 180/197, 248, 249, 233; 74/710.5

[56] References Cited

U.S. PATENT DOCUMENTS 3,845,671 11/1974 Sharp et al. ...................... 74/710.5
4,511,014 4/1985 Makita ............................... 180/197
4,521,856 6/1985 Phelps ................................ 180/197
4,552,241 11/1985 Suzuki ............................... 180/249
4,566,544 1/1986 Suzuki ............................... 180/249

FOREIGN PATENT DOCUMENTS 0063432 10/1982 European Pat. Off. .
0090944 10/1983 European Pat. Off. .
0118155 9/1984 European Pat. Off. .
2241666 3/1973 Fed. Rep. of Germany ...... 180/197
50-147027 11/1975 Japan .
55-72420 5/1980 Japan .
138020 10/1981 Japan .
2158270 11/1985 United Kingdom ............... 180/197
2158903 11/1985 United Kingdom .

Primary Examiner—Charles A. Marmor
Attorney, Agent, or Firm—Oliff & Berridge

[57] ABSTRACT

A central differential device for differentially transmitting rotational power from the engine to the front wheel propeller shaft and the rear wheel propeller shaft in a vehicle is locked up step by step to restrict its differential operation gradually when the difference between front wheel rotational speed and rear wheel rotational speed is larger than a reference value while checking at each step before further increasing the degree of locking up if the difference is still larger than the reference value which may be changed for such each step.

12 Claims, 15 Drawing Sheets

DEVICE FOR CONTROLLING 4WD VEHICLE CENTRAL DIFFERENTIAL RESTRICTION DEVICE ACCORDING TO FRONT AND REAR WHEELS ROTATIONAL SPEED DIFFERENCE, AND METHOD OF OPERATION THEREOF

BACKGROUND OF THE INVENTION

The present invention relates to a central differential operation restriction device control device and to a method of operation thereof, for a vehicle adapted for four wheel drive operation and incorporating a four wheel drive power transmission system, and more particularly relates to such a central differential operation restriction device control device and method of operation thereof for a vehicle such as an automobile incorporating such a four wheel drive power transmission system, said central differential operation restriction device control device and method providing control according to the discrepancy between the rotational speed of the rear vehicle wheels and the rotational speed of the front vehicle wheels.

The present invention has been described in Japanese Patent Applications Ser. Nos. 61-105473, 61-105475, 61-133065, 61-153172, and 61-230543 (1986), all of them having been filed by an applicant the same as the entity assigned or owed duty of assignment of the present patent application; and the present patent application hereby incorporates into itself by reference the text of said Japanese Patent Applications and the claims and the drawings thereof; copies are appended to the present application.

Nowadays a greatly increasing number of automotive vehicles are being constructed with four wheel drive transmission systems, because such four wheel drive operation, in which all four wheels of the vehicle are powered from its engine via its transmission, is very suitable for driving on poor or slippery road surfaces such as in mud or over bad ground, or upon roads covered with mud, snow, ice, or rain. In other words, four wheel drive operation provides a much higher degree of stability and drivability for the vehicle in conditions where the coefficient of friction between the wheels and the surface upon which the vehicle is riding is relatively low. Also, four wheel drive operation is beneficial for aiding with hill climbing characteristics and high speed stability characteristics. Therefore, the so called full time four wheel drive type of transmission, which remains always engaged to four wheel drive without any episodes of two wheel dring, is becoming more and more popular.

In such a four wheel drive transmission system for an automotive vehicle, it is usual to provide a center differential device for distributing rotational power between the front wheels of the vehicle and the rear wheels of the vehicle, as well as the per se conventional rear differential device that provides differential action between the two rear vehicle wheels and the also per se conventional front differential device that provides differential action between the two front vehicle wheels. Such a central or front-rear differential device is provided in order to provide a differential action between said front vehicle wheels (considered as a pair) and said rear vehicle wheels (also considered as a pair) when the vehicle is turning around a curve, in order to eliminate the possibility of the occurrence of the so called tight corner braking phenomenon created by the difference in the turning radiuses of the front wheels of the vehicle and the rear wheels thereof (and also for various other reasons). And such provision of such a central or front-rear differential device is effective for achieving this result. Further, it has been practiced to provide an automatic transmission system to a vehicle which is equipped with such a four wheel drive type transmission. Such a type of structure is disclosed, for example, in Japanese Patent Application Laying Open Publication Ser. No. 56-138020 (1981). Further, it is per se conventional to provide, to such a center differential device, a torque distribution control clutch such as a central differential control clutch, which serves for regulating the distribution of the drive torque produced by the engine of the vehicle between the rear wheels of the vehicle (taken as a combination) and the front wheels of the vehicle (taken as a combination). Such a type of construction is disclosed, for example, in Japanese Patent Application Laying Open Publication Serial No. 50-147027 (1975) and in Japanese Patent Application Laying Open Publication Serial No. 55-72420 (1980). And such a torque distribution control clutch such as a central differential control clutch is typically controlled by a hydraulically operated servo device, so that the engagement pressure of said torque distribution control clutch, i.e. the maximum amount of torque that said torque distribution control clutch can transmit, which defines the amount of torque redistribution which said torque distribution control clutch can provide between the rear wheels of the vehicle (taken as a combination) and the front wheels of the vehicle (taken as a combination), is regulated by the magnitude of an actuating hydraulic fluid pressure. And such an actuating hydraulic fluid pressure is typically provided by a control system such as a hybrid electrical/hydraulic control system which may include a microcomputer.

Such a torque distribution control clutch or central differential action restriction means is typically provided for the following reason. If even one of the vehicle wheels slips, which may well occur especially when the vehicle is being operated upon a bad road surface such as when it is raining, it is snowing, or when the road is muddy, drive power will be lost, whereupon there is the problem that because of the differential effect of the center differential device the drive power of all wheels will be reduced, and the so called trailblazability of the vehicle will be severely deteriorated. In, therefore, a four wheel drive device having a center differential device, such a differential restriction device is typically provided. A four wheel drive device has already been proposed, constructed so that, when the difference between the rear wheel revolution rate and the front wheel revolution rate is at least a certain value, that is, when one vehicle tire is slipping with respect to the road surface, the differential control clutch is engaged, and the rear wheels and front wheels are directly coupled, whereas at other times the differential control clutch is released and the center differential device is allowed to carry out a differential effect; this is described in Japanese Patent Laying Open Publication Sho 55-72420 (1980).

If the differential effect of the center differential device is disabled when the difference between the front wheel and rear wheel revolution rates is at least a certain value, then the trailblazability of the vehicle upon a bad road surface is improved by the provision of the four wheel drive state with the front and rear wheels directly coupled, but, with this approach, when the certain difference in rotation rate between the front and rear wheels is attained, the drive state of the vehicle suddenly changes to four wheel drive state with the combination of the front and the combination of the rear wheels being abruptly directly coupled, and starting off on bad road trailblazability cannot be carried out smoothly. Moreover, when starting off, with the front and rear wheels being maintained in the directly coupled state by the action of the differential restriction device, it might be considered to make the torque distribution between front and rear correspond to the weight distribution ratio between front and rear wheels. If, however, the weight distribution ratio varies between the front and rear wheels, then the tire radius also differs between front and rear wheels, and there will be a difference in the rate of rotation between front and rear wheels, and at this point the front and rear wheels will be directly coupled, whereupon a circulation torque, the so-called screw up torque, occurs, accompanied by power losses and vibration.

SUMMARY OF THE INVENTION

The inventors of the present invention have considered the various problems detailed above in the aforementioned type of four wheel drive type vehicle incorporating such a four wheel drive power transmission system.

Accordingly, it is the primary object of the present invention to provide an improved vehicle central differential operation restriction device control device for a four wheel drive type vehicle, and a corresponding method for operating such a device, which avoid the problems detailed above.

It is a further object of the present invention to provide such a vehicle central differential operation restriction device control device and method, which ensure that, on bad roads and the like, even if slipping of one of a plurality of vehicle wheels with respect to the road surface being driven on occurs, good trailblazability can be carried out with smooth starting off of the vehicle from rest.

It is a further object of the present invention to provide such a vehicle central differential operation restriction device control device and method, which ensure that, on bad roads and the like, even if slipping of one of a plurality of vehicle wheels with respect to the road surface being driven on occurs, the prevalence of circulation torque or screw up torque does not occur.

It is a yet further object of the present invention to provide such a vehicle central differential operation restriction device control device and method, which are not subject to hunting.

According to the most general device aspect of the present invention, these and other objects are attained by, for a four wheel drive vehicle with two front wheels, two rear wheels, an engine, and a central differential device, rotational power from said engine being provided via said central differential device to the combination of the front wheels of said vehicle and also to the combination of the rear wheels of said vehicle, and further comprising a device for selectively restricting the operation of said central differential device: a central differential operation restriction device control device, comprising: (a) a means for detecting the rotational speed of said combination of the front wheels of said vehicle; (b) a means for detecting the rotational speed of said combination of the rear wheels of said vehicle; and: (c) a means for controlling said device for selectively restricting the operation of said central differential device, so that: said operation of said central differential device is substantially not restricted when the discrepancy between the rotational speed of said combination of the front wheels of said vehicle and the rotational speed of said combination of the rear wheels of said vehicle is not greater than a determinate value; and, when the discrepancy between the rotational speed of said combination of the front wheels of said vehicle and the rotational speed of said combination of the rear wheels of said vehicle is greater than said determinate value, increasing gradually the amount of restriction of the operation of said central differential device, provided by said device for so doing; and, according to the most general method aspect of the present invention, these and other objects are attained by, for a four wheel drive vehicle with two front wheels, two rear wheels, an engine, and a central differential device, rotational power from said engine being provided via said central differential device to the combination of the front wheels of said vehicle and also to the combination of the rear wheels of said vehicle, and further comprising a device for selectively restricting the operation of said central differential device: a central differential operation restriction device control method, wherein: (a) the rotational speed of said combination of the front wheels of said vehicle is detected; (b) the rotational speed of said combination of the rear wheels of said vehicle is detected; and: (c) said device for selectively restricting the operation of said central differential device is so controlled that: said operation of said central differential device is substantially not restricted when the discrepancy between the rotational speed of said combination of the front wheels of said vehicle and the rotational speed of said combination of the rear wheels of said vehicle is not greater than a determinate value; and, when the discrepancy between the rotational speed of said combination of the front wheels of said vehicle and the rotational speed of said combination of the rear wheels of said vehicle is greater than said determinate value, the amount of restriction of the operation of said central differential device, provided by said device for so doing, is gradually increased.

The logic for mensurating the discrepancy between the rear wheel rotational speed and the front wheel rotational speed may be either by calculating the rotation rate difference or by calculating the rotational speed ratio.

The differential restriction device used for the application of the control device and the control method according to the present invention is typically capable of varying freely its maximum torque transmission capacity in response to an external control signal, and as this differential restriction device may be used a hydraulic servo type of wet multi plate clutch, an electromagnetic powder clutch, or the like.

According to such a device and such a method as described above, when the magnitude of the discrepancy between the rear wheel rotational speed and the front wheel rotational speed is not more than a certain value, the torque transmission capacity of the differential restriction device is set to substantially zero, and the center differential device is able to carry out freely its differential effect, whereby not only is the tight corner braking phenomenon in which this discrepancy does not reach a value larger than the certain value avoided, but also circulation torque when starting off is substantially prevented from occurring. When drive force can no longer be transmitted from the front wheels or rear wheels to the road surface, and slippage occurs, then the magnitude of the discrepancy between the rear wheel rotational speed and the front wheel rotational speed will become at least the certain value, whereupon the torque transmission capacity of the differential restriction device will be gradually increased so that the differential effect of the center differential device is gradually restricted, and thereby the vehicle will gradually approach the four wheel drive state with the front and rear wheels directly coupled, the driving characteristics of the vehicle will be improved, and the trailblazability will be improved, and bad road surface trailblazability will be able to be carried out gradually with smooth starting off of the vehicle from rest.

BRIEF DESCRIPTION OF THE DRAWINGS

The present invention will now be described with respect to the preferred embodiments of the device and of the method thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and chambers and flow chart steps and so on in the various figures relating to one preferred embodiment, and like parts and chambers and flow chart steps and so on in the various figures relating to different preferred embodiments; and:

DESCRIPTION OF THE PREFERRED EMBODIMENTS

The present invention will now be described with reference to the preferred embodiments of the device and of the method thereof, and with reference to the figures.

First Overall Vehicle Power Train Structure

Figure 1:
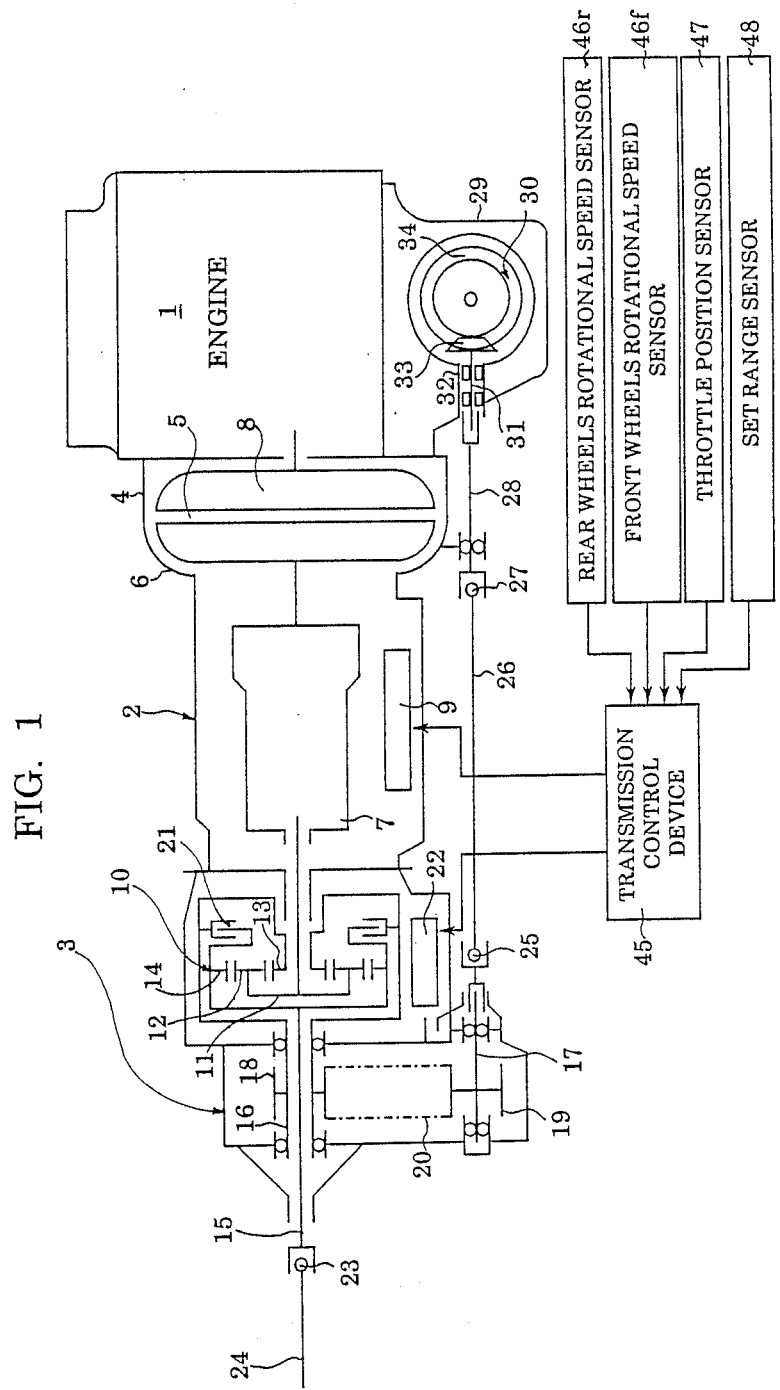
FIG. 1 is a schematic longitudinal skeleton view of a vehicle power train and of a control system therefor which incorporates the first preferred embodiment of the vehicle central differential operation restriction device control device of the present invention, for practicing the first preferred method embodiment.

FIG. 1 is a schematic longitudinal skeleton view of a power train of a vehicle, which incorporates the first preferred embodiment of the control device of the present invention for controlling a four wheel drive vehicle central differential operation restriction device, said control device performing the first preferred method embodiment. In this figure, the reference numeral 1 denotes an internal combustion engine of the vehicle, which is mounted, in this exemplary case, longitudinally in the front engine room (not particularly shown) of said vehicle. And the reference numeral 2 denotes an automatic speed change device (automatic transmission) of a per se known type mounted to the rear of the engine 1, while 3 denotes a four wheel drive power transfer device which is always operating in so called full time four wheel drive mode, so as always to drive both the rear pair of wheels of the vehicle and also the front pair of wheels of the vehicle, albeit with the differential action provided by this four wheel drive power transfer device 3 being selectably either not provided at all, being provided to a limited degree, or being fully provided, as will be explained in detail hereinafter.

In more detail, the automatic speed change device 2 incorporates a fluid torque converter 5 of a per se known construction, and the power input member 8 of this fluid torque converter 5 is connected via an input shaft to and receives rotational power from a crank shaft of the internal combustion engine 1. And the fluid torque converter 5 is housed within a torque converter housing 4 which is fitted against and is secured to the main body of the internal combustion engine 1, while the automatic speed change device 2 comprises a gear transmission mechanism 7, which is likewise housed within a speed change device housing 6 fitted against and secured to the torque converter housing. And the input shaft of the gear transmission mechanism 7 is connected to and receives rotational power from the power output shaft of the fluid torque converter 5; and thereby the gear transmission mechanism 7 receives rotational power from the internal combustion engine 1, with a certain degree of slippage and also torque amplification being provided for said rotational power by the fluid torque converter 5 (unless a lock up clutch thereof, if provided thereto, is activated; such arrangements are not particularly shown) as is per se conventional. This gear transmission mechanism 7 may for the purposes of this specification be of a per se known type incorporating various planetary gear mechanisms and friction engaging mechanisms such as clutches and brakes, and, according to selective actuation of said friction engaging mechanisms provided in a per se known manner by an electrically controlled electric/hydraulic control mechanism 9 of a per se known sort including various speed change values and/or solenoids and so on, provides any one of a plurality of speed reduction stages between its said power input shaft and its power output shaft, its said power output shaft driving the four wheel drive power transfer device 3.

This four wheel drive power transfer device 3 incorporates a center differential device 10 of a planetary gear wheel type for providing full time differential action between the front wheels of the vehicle and the rear wheels of the vehicle during the full time four wheel drive operation thereof. Now the detailed construction of this center differential device 10 will be explained. It comprises a sun gear 13, a ring gear 14, a carrier 11, and a plurality of planetary pinions 12 which are rotatably mounted to said carrier 11 and meshed between the sun gear 13 and the ring gear 14 and which perform planetary movement between the same in a per se known manner. The carrier 11 functions as an input member for this center differential device 10, and said carrier 11 is rotationally connected to the output shaft of the gear transmission mechanism 7 via a transfer shaft which passes through the central axial hole of the hollow sun gear 13. The ring gear 14 functions as one power output member for the center differential device 10 for supplying power to the rear wheels of the vehicle, and is rotationally connected to a rear wheel power output shaft 15 which extends out of the four wheel drive power transfer device 3 in the direction to the left as seen in FIG. 1, i.e. towards the rear of the vehicle in this particular exemplary implementation. And the sun gear 13 functions as another power output member for the center differential device 10 for supplying power to the front wheels of the vehicle, and is rotationally connected to a sleeve shaped intermediate front wheel drive shaft 16, via a drum member which fits around the entire differential device. This intermediate front wheel drive shaft 16 is hollow and is fitted around the rear wheel power output shaft 15, and on its outside there is fixedly mounted a sprocke wheel 18. An endless chain 20 is fitted around this sprocket wheel 18 and also around another sprocket wheel 19 provided below said sprocket wheel 18, from the point of view of the figure and in the actual vehicle body also, and the central axis of this sprocket wheel 19 extends parallel to the central axis of the sprocket wheel 18. This sprocket wheel 19 is fixedly mounted on a front wheel power output shaft 17, one end of which protrudes from the housing of this four wheel drive power transfer device 3 in the rightwards direction in the figure, i.e. towards the front end of the vehicle in this particular exemplary implementation.

Thus, the power distribution ratio (drive torque distribution) between the intermediate front wheel drive shaft 16 and the rear wheel power output shaft 15, when this four wheel drive power transfer device 3 is operating freely (i.e. when a clutch 21 to be described shortly is in the fully released condition), is determined by the relative tooth counts of the sun gear 13 and the ring gear 14 by the expressions $Rr=1/(1+Rg)$ and $Rf=Rg(1+Rg)$, where Rr is rear wheel distribution ratio, Rf is the front wheel distribution ratio, and Rg is the ratio of the number of teeth on the sun gear 13 to the number of teeth on the ring gear 14. Because the number of teeth on the sun gear 13 is naturally greater than the number of teeth on the ring gear 14, thus, providing that the number of teeth on the sprocket wheel 18 and the number of teeth on the sprocket wheel 19 are the same, and the gearing ratios of the differential devices for the front pair of vehicle wheels and for the rear pair of vehicle wheels are the same, this four wheel drive power transfer device 3 is of the type which distributes a larger amount of torque to the rear vehicle wheels than to the front vehicle wheels. And it should be particularly noted that, in this particular exemplary power train, the center differential device 10 is constructed with a planetary gearing ratio such that said center differential device 10 provides a torque distribution ratio between the front vehicle wheels and the rear vehicle wheels which corresponds to the ratio of distribution of vehicle weight between said front vehicle wheels and said rear vehicle wheels at the moment of starting off of the vehicle from rest, when said vehicle is being subjected to maximum acceleration.

Within the four wheel drive power transfer device 3 there is provided a hydraulically operated wet type clutch 21, which selectively rotationally connects together the sun gear 13 and the ring gear 14, either completely or partially, or alternatively allows said members to rotate freely with respect to one another. This wet clutch 21, the construction and the actuation of which will be explained in some detail shortly, is selectively operated to a greater or lesser engagement extent (this expression relates to the maximum torque transmission capability of said wet clutch 21) by supply of actuating hydraulic fluid pressure of a greater or lesser pressure value from an electrically actuated electric/hydraulic control device 22, an exemplary construction for which will be outlined hereinafter. Accordingly, the four wheel drive power transfer device 3, which receives rotational power input from the gear transmission mechanism 7 and outputs said rotational power to the rear wheel power output shaft 15 and to the front wheel power output shaft 17, can be caused either to provide (in the case that the wet clutch 21 is fully disengaged) substantially free differential action for distributing said rotational power between said rear wheel power output shaft 15 and said front wheel power output shaft 17, or not to provide (in the case that the wet clutch 21 is fully engaged) any such differential action at all and just to drive said shafts 15 and 17 independently, or to provide (in the case that the wet clutch 21 is partially but not fully engaged) a condition intermediate between these two extreme conditions, so as to partly allow the center differential device 10 to provide its differential action for distributing said rotational power between said rear wheel power output shaft 15 and said front wheel power output shaft 17 to some extent, while being somewhat impeded by the dragging action of the clutch 21, up to a certain maximum dragging action amount, which is determined by the maximum torque transmission capacity of said wet clutch 21 in the particular operational circumstances.

Via a universal joint 23 of a per se known sort, the rear end of the rear wheel power output shaft 15 rotationally drives the front end of a rear wheel propeller shaft 24. And the rear end of this rear wheel propeller shaft 24 is connected via another universal joint (not particularly shown) to a differential device, (not particularly shown either), for driving the rear wheels (also not shown) of the vehicle.

And, via a universal joint 25 also of a per se known sort, the front end of the front wheel power output shaft 17 rotationally drives the rear end of a front wheel propeller shaft 26. Thus, this front wheel propeller shaft 26 extends alongside and generally below the casing 6 of the automatic speed change device 2 including the fluid torque converter 5 therein, roughly parallel to the longitudinal axis thereof and on one side thereof. The front end of this front wheel propeller shaft 26 is rotationally connected, via another universal joint 27 also of a per se known sort, via a short intermediate shaft 28 which is supported from the torque converter casing by means of a bearing assembly, and via yet another universal joint also of a per se known sort, to the outer end of a drive pinion shaft 31 which constitutes the power input shaft of a front differential device 30 which drives the front wheels (not shown) of the vehicle. And this drive pinion shaft 31 is also rotatably supported at its intermediate portion from the casing 32 of the front differential device 30 (this casing 32 is integrally formed with the oil pan of the internal combustion engine 1), and the inner end of this drive pinion shaft 31 is provided with a drive pinion 33 which is constituted as a bevel gear, with said drive pinion 33 being meshingly engaged with a driven ring gear 34 of the front differential device 30.

Operation of this Power Train

This vehicle power train operates as follows. When the clutch 21 of the four wheel drive power transfer device 3 is operated by the electrically actuated electric/hydraulic control device 22 so as not at all to rotationally connect together the sun gear 13 and the ring gear 14, then the center differential device 10 functions so as to provide its differential effect between the rear wheel power output shaft 15 and the intermediate front wheel drive shaft 17 in full measure, i.e. so as to receive rotational power provided by the engine 1 of the vehicle and transmitted to said four wheel drive power transfer device 3 via the automatic speed change device 2, and to distribute said rotational power, while providing a non damped differential effect, between the rear wheels of the vehicle taken as a combination and the front wheels of the vehicle taken as a combination. On the other hand, when the clutch 21 of the four wheel drive power transfer device 3 is operated by the electrically actuated electric/hydraulic control device 22 so as to completely rotationally connect together the sun gear 13 and the ring gear 14, i.e. so as to provide an effectively unlimited degree of torque transmission, then the center differential device 10 functions so as to provide no such differential effect at all between the rear wheel power output shaft 13 and the intermediate front wheel drive shaft 14, i.e. so as to distribute the rotational power provided from the engine 1 via the automatic speed change device 2 directly to the rear wheels 24 of the vehicle taken as a combination and also to the front wheels 8 of the vehicle taken as a combination in an even fashion without any provision of any differential effect at all. And, in the intermediate case between these two extremes, when said clutch 21 of said four wheel drive power transfer device 3 is operated by said electrically actuated electric/hydraulic control device 22 so as somewhat to rotationally connect together said sun gear 13 and said ring gear 14, i.e. so as to provide a certain relatively limited degree of dragging or torque transmitting effect between these members, then said center differential device 10 functions so as to provide its differential effect between said rear wheel power output shaft 15 and said intermediate front wheel drive shaft 17 to a relatively limited or partial degree, i.e. so as to receive rotational power provided by said engine 1 of said vehicle and transmitted to said four wheel drive power transfer device 3 via said automatic speed change device 2, and to distribute said rotational power, while providing a partially damped differential effect, between said rear wheels of said vehicle taken as a combination and said front wheels of said vehicle taken as a combination.

The Central Differential Control Clutch 21 and its Actuating System

Figure 2:
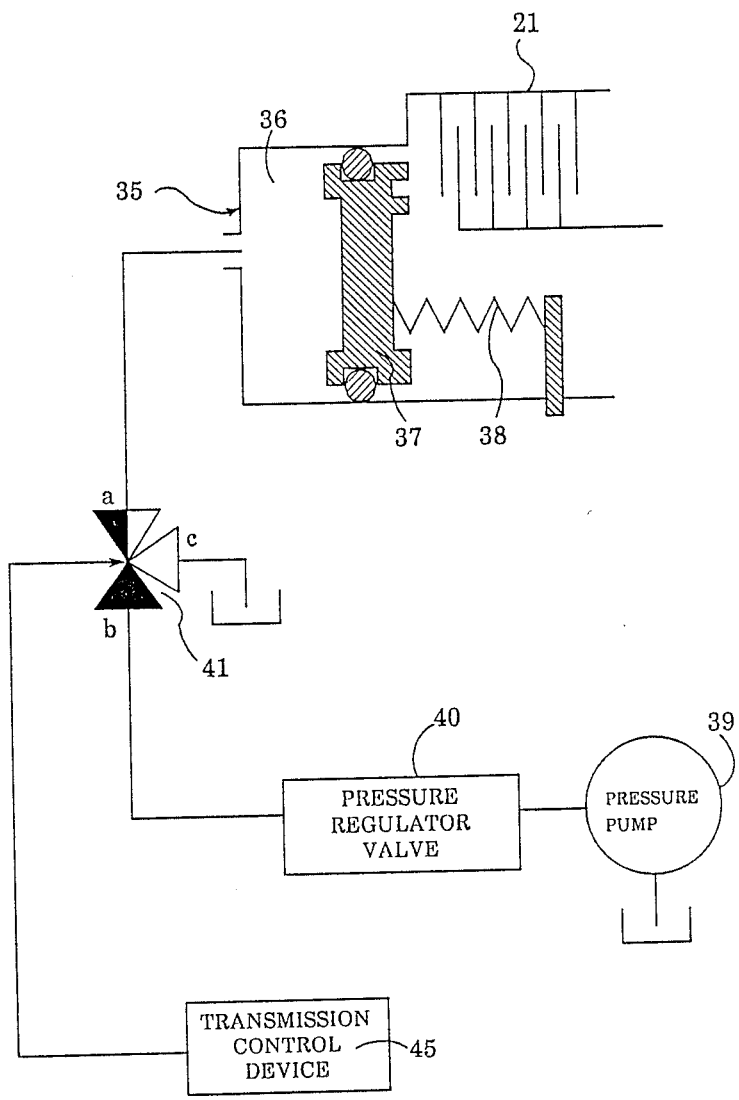
FIG. 2 is a partially longitudinal sectional partially schematic block diagrammatical view of a torque transfer clutch which is provided to a center differential device of the FIG. 1 power train, and of an actuating servo device for said torque transfer clutch, for showing details of their constructions, said torque transfer clutch and said actuating servo device therefor being controlled by said first preferred embodiment of the vehicle central differential operation restriction device control device of the present invention, according to the first method embodiment.

In FIG. 2, there is shown a schematic partly cross sectional view of the central differential control clutch 21 of the four wheel drive power transfer device 3, and of an actuating system including a servo device 35 for said clutch 21, as incorporated in the shown central differential operation restriction device, to which the first preferred embodiment of the control device therefor of the present invention is applied; however, this particular arrangement should not be taken as unduly limitative of the present invention, as other possibilities for these structures could also be implemented, in alternative constructions. In this figure, the central differential control clutch 21 is shown as being a hydraulic servo type wet clutch, comprising two sets of mutually interleaved and sandwiched together clutch plates, one of said clutch plates sets being rotationally fixed with respect to the sun gear 13 of the center differential device 10, while the other said set of clutch plates are rotationally fixed with respect to the ring gear 14 of said center differential device 10. Thus, when the sets of clutch plates are squeezed together by the servo device 70 as will be explained in detail shortly, torque transmission between the sun gear 13 and the ring gear 14 of the center differential device 10 is provided in a degree corresponding to the degree of squeezing together of said sets of clutch plates, i.e. in a degree corresponding to the total force acting to squeeze the sandwich of said sets of clutch plates together.

The servo device 35 provided for thus pressing and squeezing together said sets of clutch plates comprises a pressure chamber 35 and a servo piston 37, all of these members and chambers being annular. The servo piston 37 confronts the sandwiched together sets of clutch plates, for opposing said clutch plate sets and for pressing them together, when said servo piston is biased in the direction towards said clutch plate sets (rightwards in FIG. 2). And, when the pressure chamber 36 is pressurized with hydraulic fluid, it presses the servo piston 37 against the clutch plate sets 66 and 68 and squeezes them together. A spring 38, which in fact is an annular spring, and which bears upon a spring retainer member, is provided for biasing said servo piston 37 in the leftwards direction as seen in FIG. 2, so as to reduce the size of the pressure chamber 36. Thereby, when no substantial hydraulic fluid pressure is supplied to said pressure chamber 36, under the biasing action of the spring 38 the servo piston 37 is biased in the leftwards direction as seen in the drawing, so as to not substantially compress the superposed sandwich of the clutch plate sets and thus to let said clutch plate sets be not substantially mutually engaged; and, thereby, no substantial degree of torque transmission between the sun gear 13 and the ring gear 14 of the center differential device 10 is provided. On the other hand, when a substantial degree of hydraulic fluid pressure is supplied to the pressure chamber 36, the servo piston 37 is biased, against the biasing action of the spring 38 which is overcome, in the rightwards direction as seen in the drawing, so that said servo piston 37 presses against and compresses the superposed sandwich of the clutch plate sets with a force determined according to the magnitude of the pressure value supplied to said pressure chamber 36, thereby causing said clutch plate sets to be mutually engaged together with a torque transmission capability determined according to said magnitude of said pressure value supplied to said pressure chamber 36; and, thereby, torque transmission between the sun gear 13 and the ring gear 14 of the center differential device 10 is provided, similarly with a magnitude determined according to the magnitude of the pressure value supplied to the pressure chamber 36.

The electrically actuated electric/hydraulic control device 22, to define its action in a functional sense, supplies a hydraulic fluid pressure of any desired pressure level from substantially zero up to line pressure to the pressure chamber 36 of this servo device 35, according to the value of an electrical control signal supplied to it; this electric signal may be a pulse signal, and the duty ratio of said pulse signal may control the pressure supplied said pressure chamber 36 of the servo device 35, for example. Thus, by varying the value of said electrical signal, it is possible to vary the degree of torque transmission between the sun gear 13 and the ring gear 14 of the center differential device 10 between substantially zero and a substantially maximum value. In the suggested exemplary construction shown in FIG. 2, the electrically actuated electric/hydraulic control device 22 comprises a electromagnetically actuated hydraulic switching valve 41, which receives supply at its port designated in the figure as "b" of hydraulic fluid pressurized by a pressure pump 39 (incorporated in the automatic transmission 2) and pressure regulated by a pressure regulator valve 40, whose port designated in the figure as "a" is connected to the pressure chamber 36 of the servo device 75 for supplying pressurized hydraulic fluid thereto, and whose port designated in the figure as "c" is connected to a drain. This electromagnetically actuated hydraulic switching valve 41 is so constituted that when actuating electrical energy is supplied to a solenoid or the like incorporated therein it communicates its port "a" to its port "b" while not communicating its port "c" to any other port; on the other hand, when no such actuating electrical energy is supplied to said solenoid or the like of said electromagnetically actuated hydraulic switching valve 41, it communicates its port "a" to its port "c" while not communicating its port "b" to any other port. Thereby, by the electromagnetically actuated hydraulic switching valve 41 being supplied with a pulse type electrical signal, said electromagnetically actuated hydraulic switching valve 41 supplies a pressure value to the pressure chamber 36 of the servo device 75 which is determined according to the duty ratio of said pulse electrical signal. This controlling pulse electrical signal is supplied from a transmission control device 45, now to be explained.

The Transmission Control System

Referring to FIG. 1, it will be seen that the following detectors and sensors are provided to this system. A rear wheels rotational speed sensor 46r detects a value representative of the rotational speed of the rear wheels of the vehicle by measuring the rotational speed of a member rotationally coupled to the rear wheel power output shaft 15, or the like, and outputs an electrical signal representative thereof. A front wheels rotational speed sensor 46f detects a value representative of the rotational speed of the front wheels of the vehicle by measuring the rotational speed of a member rotationally coupled to the front wheel power output shaft 17, or the like, and outputs an electrical signal representative thereof. A throttle position sensor 47 detects a value representative of the current load on the internal combustion engine 1 by measuring the opening angle of the throttle valve (not particularly shown) of a carburetor (not shown either) of said engine 1, and outputs an electrical signal representative thereof. And a set range sensor 48 detects the set position of a manual range setting valve which is provided for the transmission mechanism 2, or of a setting means therefor, and outputs an electrical signal representative thereof; this manual range setting valve is not particularly shown in the figures, but said setting means therefor is provided in the passenger compartment of the vehicle so as to be readily accessible to the driver of the vehicle, and can be set to any one of a number of set positions corresponding to various operational ranges for the transmission mechanism 2 such as "D" range, "2" range, "L" range, "R" range, "N" range, and "P" range. The output signals of these four sensors 46r, 46f, 47, and 48 are fed to a transmission control device 45.

This transmission control device 45 outputs control signals for controlling the electric/hydraulic control device 22 for the four wheel drive power transfer device 3 and the electrical/hydraulic control mechanism 9 for the gear transmission mechanism 7, according to principles which incorporate the concept of the first preferred embodiments of the vehicle central differential operation restriction device control device and method of the present invention, as will be explained hereinafter. No concrete illustration of the structure of particular realization of the transmission control device 45 will be given herein, since various possibilities for the details thereof can be easily supplemented by one of ordinary skill in the electronic and computer programming art based upon the functional disclosures set out in this specification. In the preferred embodiments of the device and the method of the present invention, the transmission control device 45 is concretely realized as a micro computer and its associated circuitry, said micro computer operating at the behest of a control program which will not be completely detailed, since the details thereof which are not disclosed herein can likewise be easily supplemented by one of ordinary skill in the electronic and computer programming art based upon the functional disclosures set out in this specification. However, it should be particularly understood that such realizations in the micro computer form, although preferred, are not the only ways in which the transmission control device 45 can be provided; in other possible embodiments it could be constituted as an electrical device not incorporating a microprocessor. In the preferred case, however, such a microprocessor will typically comprise: a CPU (central processing unit) which obeys said control program to be described shortly and which inputs data, performs calculations, and outputs data; a ROM (read only memory) which stores said program to be described shortly and initialization data therefor and so on; and a RAM (random access memory) which stores the results of certain intermediate calculations and data and so on; and these devices together will constitute a logical calculation circuit, being joined together by a common bus which also links them to an input port and an output port which together perform input and output for the system. And the system will typically also include buffers for the electrical signals outputted from the various sensors and switches 46 through 48 to the input port device, and drive circuits through which actuating electrical signals are passed from the output port device to a speed change control solenoid or solenoids of the electrical/hydraulic control mechanism 9 for controlling the automatic speed change device 2 and to the solenoid or the like of the electromagnetically actuated hydraulic switching valve 41 of the electric/hydraulic control device 22 for controlling the torque transmission capacity of the clutch 21 of the four wheel drive power transfer device 3 by supplying appropriate hydraulic fluid pressure to the pressure chamber 36. It should be understood that the transmission control device 45 generally functions so as to engage an appropriate one of the various speed stages of the gear transmission mechanism 7 of the transmission mechanism 2 according to the current values of various vehicle operating parameters such as the vehicle road speed as sensed by one or another or both of the rear wheels rotational speed sensor 46r and the front wheels rotational speed sensor 46f, the engine load (throttle opening) as sensed by the throttle position sensor 47, and the operating range of the transmission as manually set by the vehicle driver on the setting means therefor as sensed by the set range sensor 48; such a transmission shift stage selection function may be performed in a per se conventional way, and no particular details thereof will be shown or suggested in this specification, since various possibilities for the details thereof can be easily supplemented as appropriate by one of ordinary skill in the transmission control and the programming arts, particularly when based upon the functional disclosures set out in this specification. Further, said transmission control device 45 generally functions as will now be explained, so as to control the torque transmission capacity of the clutch 21 of the center differential device 10 of the four wheel drive power transfer device 3, according to the current values of the rotational speed of the rear vehicle wheels as sensed by the rear wheels rotational speed sensor 46r and the rotational speed of the front vehicle wheels as sensed by the front wheels rotational speed sensor 46f; in particular, according to the difference between said rear and front wheels rotational speeds.

The Control According to the First Method Embodiment

In detail, when the absolute value of the difference deltaN between the rotational speed of the rear vehicle wheels and the rotational speed of the front vehicle wheels is not greater than a certain threshold value deltaNset, then the maximum torque transmission capacity Tc of the clutch 21 of the center differential device 10 of the four wheel drive power transfer device 3 is, over a period of time, diminished by successive relatively small steps until it reaches substantially zero; whereas, on the other hand, when said absolute value of the difference deltaN between the rotational speed of the rear vehicle wheels and the rotational speed of the front vehicle wheels is greater than said certain threshold value deltaNset, then the maximum torque transmission capacity Tc of the clutch 21 of the center differential device 10 of the four wheel drive power transfer device 3 is, over a period of time, increased by successive relatively small steps, until its increase naturally curbs said absolute value of the difference deltaN between the rotational speed of the rear vehicle wheels and the rotational speed of the front vehicle wheels. In other words, at this time, a steady state value is reached for said absolute value of the difference deltaN between the rotational speed of the rear vehicle wheels and the rotational speed of the front vehicle wheels, by a feedback process.

Figure 3:
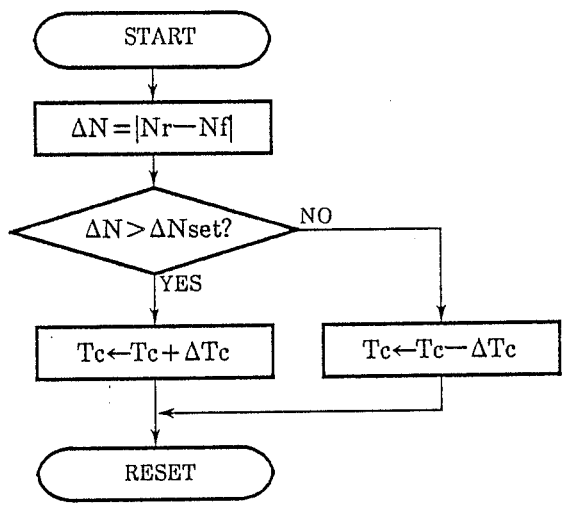
FIG. 3 is a fragmentary flow chart for showing the operation of this first preferred method embodiment, illustrating the flow of a program which is obeyed by a transmission control device which is shown by a block in FIG. 1 and is included in this first preferred device embodiment.

FIG. 3 shows a fragmentary flow chart for a portion of the aforementioned control program which directs the operation of the transmission control device 45, according to this first preferred embodiment of the four wheel drive vehicle central differential operation restriction device control device of the present invention, so as to realize the first preferred embodiment of the four wheel drive vehicle central differential operation restriction device control method of the present invention. This flow chart will now be explained; no particular programming steps for implementing said flow chart are shown or suggested in this specification, since various possibilities for the details thereof can be easily supplemented as appropriate by one of ordinary skill in the programming art, particularly when based upon the functional disclosures set out in this specification. The flow chart of FIG. 3 only shows the portion of the control program of the transmission control device 45 which controls the supply of actuating hydraulic fluid pressure to the clutch 21 of the center differential device 10 of the four wheel drive power transfer device 3, i.e. to the electrically actuated electric/hydraulic control device 22, and further only shows this process in schematic form; said FIG. 3 flow chart therefore does not show the portion of said control program relating to the control provided for the gear transmission mechanism 7 of the transmission mechanism 2. This fragment will be sufficient for exemplifying the principles of the present invention. This program portion is executed at regular intervals of for example a few milliseconds, of course after the engine 1 is started as the vehicle incorporating it is driven.

Figure 4:
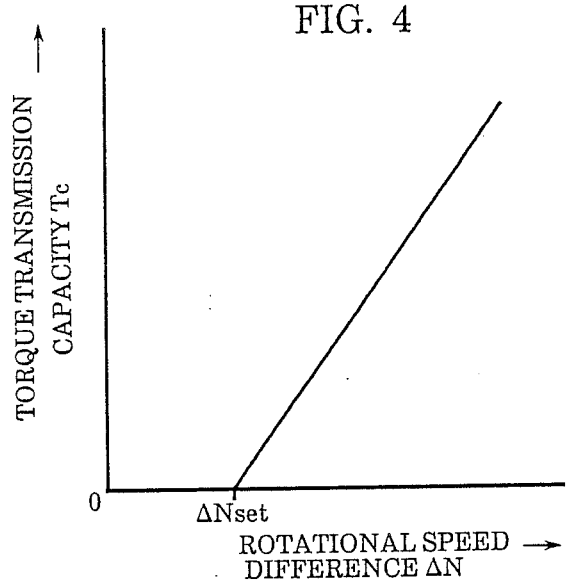
FIG. 4 is a graph which shows along the vertical axis the magnitude of the steady state torque transmission capacity which is being caused to be provided between two clutch plate sets of the FIG. 2 torque transfer clutch by their being squeezed together according to the pressure of a piston member upon them, and which shows along the horizontal axis the magnitude of the absolute value of the difference deltaN between the rotational speed of the rear vehicle wheels and the rotational speed of the front vehicle wheels.

In this flow chart, first an absolute value is calculated for the difference deltaN between the rotational speed of the rear vehicle wheels and the rotational speed of the front vehicle wheels, and then a decision is made as to whether said rotational speed difference absolute value is greater than the threshold value deltaNset, or not. If in fact said rotational speed difference absolute value is greater than said threshold value deltaNset, then the flow of control passes through a step which increases the maximum torque transmission capacity Tc of the clutch 21 of the center differential device 10 of the four wheel drive power transfer device 3 by a determinate relatively small amount deltaTc, by appropriately controlling the duty ratio of the pulse electrical signal which is supplied by the transmission control device 45 to the solenoid or the like of the electromagnetically actuated hydraulic switching valve 41, thereby controlling the value of the hydraulic fluid pressure supplied to the chamber 36 of the servo device 35 for said clutch 21; while, on the other hand, if in fact said rotational speed difference absolute value is not greater than said threshold value deltaNset, then the flow of control passes through a different step which decreases said maximum torque transmission capacity Tc of the clutch 21 of the center differential device 10 of the four wheel drive power transfer device 3 by, in this first preferred embodiment, the same determinate relatively small amount deltaTc, again by appropriately controlling the duty ratio of said pulse electrical signal which is supplied by the transmission control device 45 to the solenoid or the like of the electromagnetically actuated hydraulic switching valve 41. And, by the repeated performance of the FIG. 3 program fragment at regular and relatively brief intervals, the maximum torque transmission capacity Tc of the clutch 21 is relatively quickly brought to a steady state value. The graph of FIG. 4 shows along the vertical axis the magnitude of this steady state maximum torque transmission capacity which is thus caused to be provided between the clutch plate sets of the clutch 21 by their being squeezed together by the pressure of the piston 37 against them, and shows along the horizontal axis the magnitude of the absolute value of the difference deltaN between the rotational speed of the rear vehicle wheels and the rotational speed of the front vehicle wheels.

In other words, when the absolute value of the difference deltaN between the rotational speed of the rear vehicle wheels and the rotational speed of the front vehicle wheels is not greater than said threshold value deltaNset therefore, then the maximum torque transmitting capacity of the clutch 21 is steadily reduced until it is substantially zero, in other words until said clutch 21 is substantially disengaged. In this operational situation, the center differential device 10 is allowed to substantially freely carry out its differential action, so that the occurrence of the so called tight corner braking phenomenon is avoided, and the occurrence of the screwing up torque phenomenon during starting off of the vehicle from rest is also positively avoided.

On the other hand, when said absolute value of said difference deltaN between the rotational speed of the rear vehicle wheels and the rotational speed of the front vehicle wheels is greater than said threshold value deltaNset therefor, then the maximum torque transmitting capacity of the clutch 21 is steadily increased by the amount deltaTc, so that the operation of the center differential device 10 is steadily and progressively more and more restricted by the gradually increasing engagement of the clutch 21. In this operational situation, the center differential device 10 is more and more inhibited from carrying out its differential action, so that it becomes progressively locked up and the operational state of the vehicle progressively approaches the so called direct drive state in which the rotation of the front wheels and the rotation of the rear wheels are directly coupled together. Thereby, along with the difference deltaN between the rotational speed of the rear vehicle wheels and the rotational speed of the front vehicle wheels being progressively diminished, the drive characteristics of the vehicle are progressively improved, and the poor road condition trailblazability of the vehicle is also improved.

It should also be noted that, once the absolute value of the difference deltaN between the rotational speed of the rear vehicle wheels and the rotational speed of the front vehicle wheels rises above the threshold value deltaNset therefor, even when subsequently said absolute value of said difference deltaN between the rotational speed of the rear vehicle wheels and the rotational speed of the front vehicle wheels later drops below said threshold value deltaNset therefor again, the maximum torque transmitting capacity of the clutch 21 is not immediately reduced to zero, but instead said maximum torque transmitting capacity of said clutch 21 is reduced to zero over a certain time period, progressively by successive steps each of magnitude deltaTc. By this means, the occurrence of the so called hunting phenomenon is avoided.

The Transmission Control System in the Second Preferred Embodiment

Figure 5:
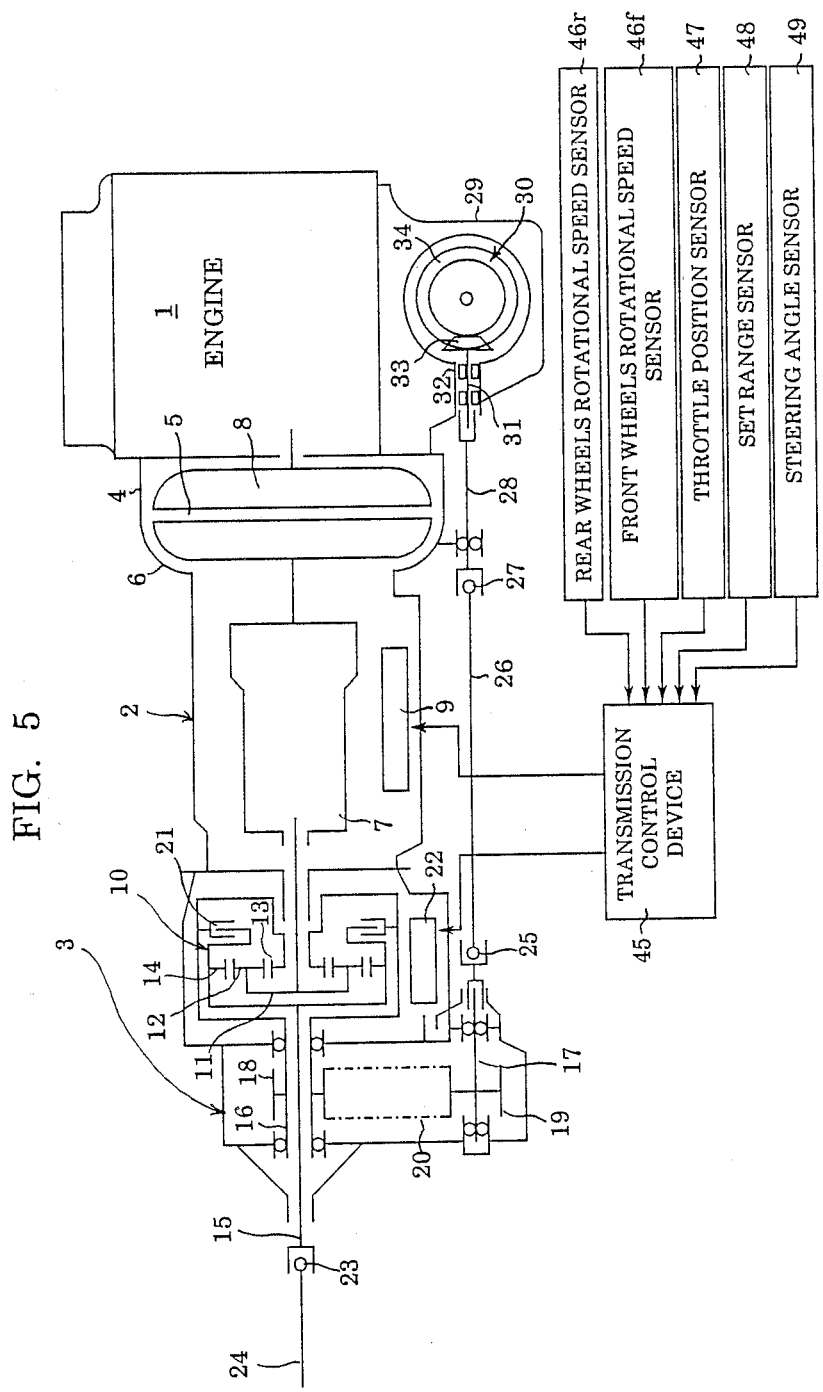
FIG. 5 is similar to FIG. 1 relating to the first preferred device and method embodiments, being a schematic longitudinal skeleton view of a vehicle power train and of a control system therefor which incorporates the second preferred embodiment of the vehicle central differential operation restriction device control device of the present invention, for practicing the second preferred method embodiment.

Referring now to FIG. 5, which is a figure similar to FIG. 1 relating to the first preferred device and method embodiments, and is a schematic longitudinal skeleton view of a vehicle power train (substantially the same as the FIG. 1 power train) and of a control system therefor which incorporates the second preferred embodiment of the vehicle central differential operation restriction device control device of the present invention, for practicing the second preferred method embodiment: it will be seen that the following detectors and sensors are provided to the transmission control system, in this case. A rear wheels rotational speed sensor 46r detects a value representative of the rotational speed of the rear wheels of the vehicle by measuring the rotational speed of a member rotationally coupled to the rear wheel power output shaft 15, or the like, and outputs an electrical signal representative thereof. A front wheels rotational speed sensor 46f detects a value representative of the rotational speed of the front wheels of the vehicle by measuring the rotational speed of a member rotationally coupled to the front wheel power output shaft 17, or the like, and outputs an electrical signal representative thereof. A throttle position sensor 47 detects a value representative of the current load on the internal combustion engine 1 by measuring the opening angle of the throttle valve (not particularly shown) of a carburetor (not shown either) of said engine 1, and outputs an electrical signal representative thereof. A set range sensor 48 detects the set position of a manual range setting valve which is provided for the transmission mechanism 2, or of a setting means therefor, and outputs an electrical signal representative thereof; again, this manual range setting valve is not particularly shown in the figures, but said setting means therefor is provided in the passenger compartment of the vehicle so as to be readily accessible to the driver of the vehicle, and can be set to any one of a number of set positions corresponding to various operational ranges for the transmission mechanism 2 such as "D" range, "2" range, "L" range, "R" range, "N" range, and "P" range. And, in this second preferred embodiment, a steering angle sensor 49 detects the steering angle of the vehicle, and outputs an electrical signal representative thereof. The output signals of these five sensors 46r, 46f, 47, 48, and 49 are fed to the transmission control device 45.

This transmission control device 45 outputs control signals for controlling the electric/hydraulic control device 22 for the four wheel drive power transfer device 3 and for controlling the electrical/hydraulic control mechanism 9 for the gear transmission mechanism 7, according to principles which incorporate the concept of the second preferred embodiment of the vehicle central differential operation restriction device control device and method of the present invention, as will now be explained. It should be understood that, as before, no concrete illustration of the structure of any particular realization of the transmission control device 45 will be given herein, since various possibilities for the details thereof can be easily supplemented by one of ordinary skill in the electronic and computer programming art based upon the functional disclosures set out in this specification. Again, in these second preferred embodiments of the device and the method of the present invention, the transmission control device 45 is concretely realized as a micro computer and its associated circuitry, said micro computer operating at the behest of a control program which will not be completely particularly detailed, since many of the details thereof can likewise be easily supplemented by one of ordinary skill in the electronic and computer programming art based upon the functional disclosures set out in this specification. However, as before, it should be particularly understood that such realizations in the micro computer form, although preferred, are not the only ways in which the transmission control device 45 can be provided; in other possible embodiments it could be constituted as an electrical device not incorporating a microprocessor. In the preferred case, as before, this microprocessor will typically comprise: a CPU (central processing unit) which obeys said control program to be described shortly and which inputs data, performs calculations, and outputs data; a ROM (read only memory) which stores said program to be described shortly and initialization data therefor and so on; and a RAM (random access memory) which stores the results of certain intermediate calculations and data and so on; and these devices together will constitute a logical calculation circuit, being joined together by a common bus which also links them to an input port and an output port which together perform input and output for the system. And the system will typically also include buffers for the electrical signals outputted from the various sensors and switches 46r/f through 49 to the input port device, and drive circuits through which actuating electrical signals are passed from the output port device to a speed change control solenoid or solenoids of the electrical/hydraulic control mechanism 9 for controlling the automatic speed change device 2 and to a control solenoid or the like of the electric/hydraulic control device 22 for controlling the torque transmission capacity of the clutch 21 of the four wheel drive power transfer device 3 by supplying appropriate hydraulic fluid pressure to its pressure chamber 36. It should be understood that, as before, the transmission control device 45 generally functions so as to engage an appropriate one of the various speed stages of the gear transmission mechanism 7 of the transmission mechanism 2 according to the current values of various vehicle operating parameters such as the vehicle road speed as sensed by one or another or both of the rear wheels rotational speed sensor 46r and the front wheels rotational speed sensor 46f, the engine load (throttle opening) as sensed by the throttle position sensor 47, and the operating range of the transmission as manually set by the vehicle driver on the setting means therefor as sensed by the set range sensor 48; such a transmission shift stage selection function may be performed in a per se conventional way, and no particular details thereof will be shown or suggested in this specifications, since various possibilities for the details thereof can be easily supplemented as appropriate by one of ordinary skill in the transmission control and the programming arts, particularly when based upon the functional disclosures set out in this specification. Further, said transmission control device 45 generally functions, as will now be explained, so as to control the torque transmission capacity of the clutch 21 of the center differential device 10 of the four wheel drive power transfer device 3, according to the current values of the rotational speed of the rear vehicle wheels as sensed by the rear wheels rotational speed sensor 46r and the rotational speed of the front vehicle wheels as sensed by the front wheels rotational speed sensor 46f, and of the steering angle of the steering system of the vehicle to which this four wheel drive control system is fitted, as sensed by the steering angle sensor 49.

The Control According to the Second Method Embodiment

Figure 7:
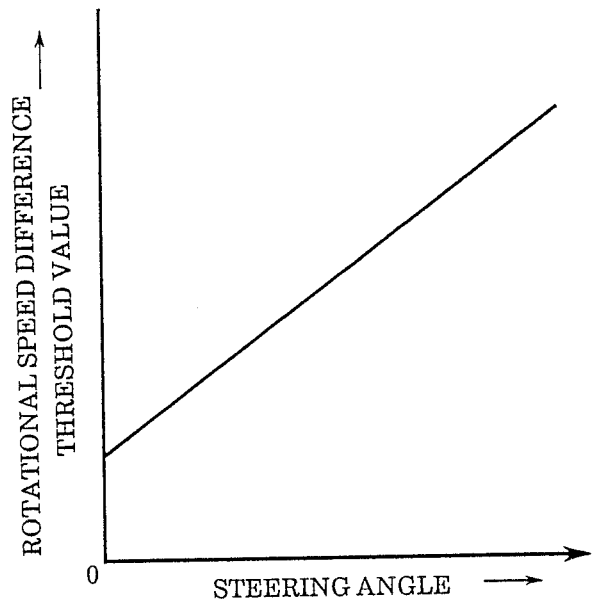
FIG. 7 is a graph relating to the operation of said FIG. 6 program fragment, showing along the vertical axis the magnitude of a threshold value for the absolute value of the difference deltaN between the rotational speed of the rear vehicle wheels and the rotational speed of the front vehicle wheels, and showing along the horizontal axis the magnitude of the current steering angle of the vehicle.

In detail, when the absolute value of the difference deltaN between the rotational speed of the rear vehicle wheels and the rotational speed of the front vehicle wheels is not greater than a certain threshold value deltaNset, said threshold value deltaNset in these second preferred embodiments being determined according to the current value of the steering angle of the vehicle and increasing according to increase of said current value of the steering angle of the vehicle as particularly shown in the FIG. 7 graph, then the maximum torque transmission capacity Tc of the clutch 21 of the center differential device 10 of the four wheel drive power transfer device 3 is, over a period of time, diminished by successive relatively small steps until it reaches substantially zero; whereas, on the other hand, when said absolute value of the difference deltaN between the rotational speed of the rear vehicle wheels and the rotational speed of the front vehicle wheels is greater than said certain threshold value deltaNset determined as just specified, then the maximum torque transmission capacity Tc of the clutch 21 of the center differential device 10 of the four wheel drive power transfer device 3 is, over a period of time, increased by successive relatively small steps, until its increase naturally curbs said absolute value of the difference deltaN between the rotational speed of the rear vehicle wheels and the rotational speed of the front vehicle wheels. In other words, at this time, a steady state value is reached for said absolute value of the difference deltaN between the rotational speed of the rear vehicle wheels and the rotational speed of the front vehicle wheels, by a feedback process.

Figure 6:
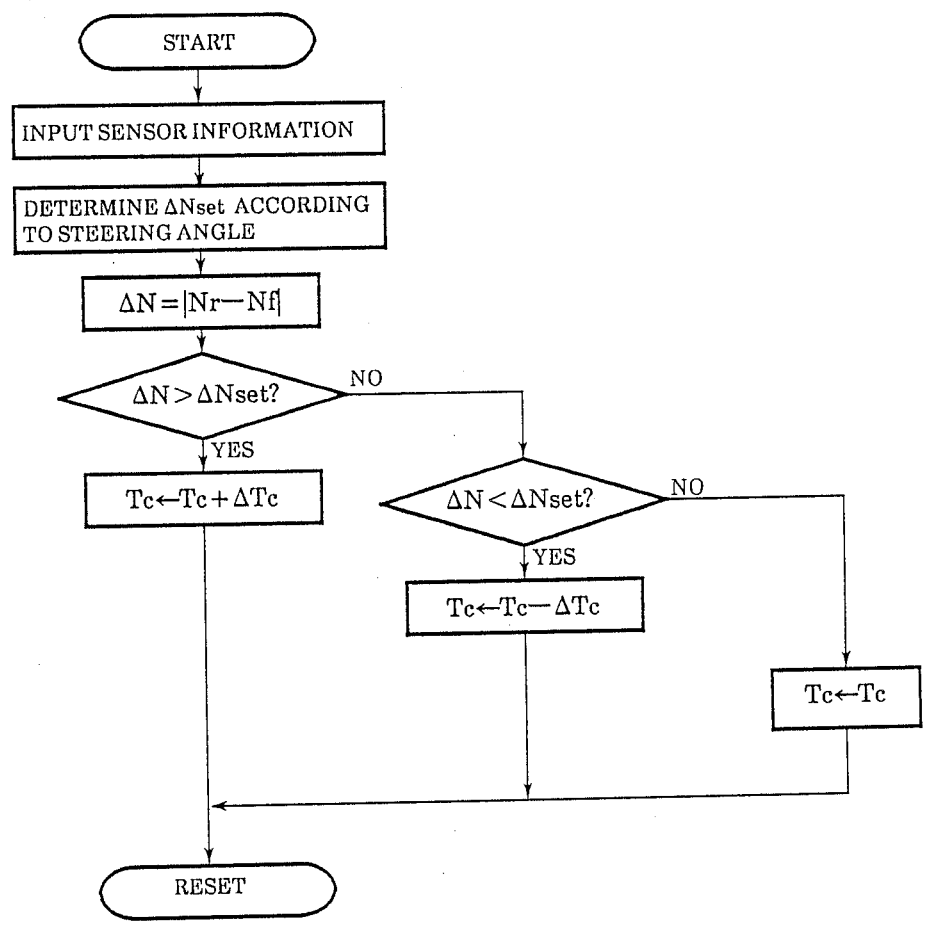
FIG. 6 is similar to FIG. 3 relating to the first preferred device and method embodiments, being a fragmentary flow chart for showing the operation of this second preferred method embodiment, illustrating the flow of a program which is obeyed by a transmission control device which is shown by a block in FIG. 4 and is included in this second preferred device embodiment.

FIG. 6 shows a fragmentary flow chart for a portion of the aforementioned control program which directs the operation of the transmission control device 45, according to this second preferred embodiment of the four wheel drive vehicle central differential operation restriction device control device of the present invention, so as to realize the second preferred embodiment of the four wheel drive vehicle central differential operation restriction device control method of the present invention. This flow chart will now be explained; no particular programming steps for implementing said flow chart are shown or suggested in this specification, since various possibilities for the details thereof can be easily supplemented as appropriate by one of ordinary skill in the programming art, particularly when based upon the functional disclosures set out in this specification. The flow chart of FIG. 6 only shows the portion of the control program of the transmission control device 45 which controls the supply of actuating hydraulic fluid pressure to the clutch 21 of the center differential device 10 of the four wheel drive power transfer device 3, i.e. to the electrically actuated electric/hydraulic control device 22, and further only shows this process in schematic form; said FIG. 6 flow chart therefore does not show the portion of said control program relating to the control provided for the gear transmission mechanism 7 of the transmission mechanism 2. This fragment will be sufficient for exemplifying the principles of the present invention. This program portion is executed at regular intervals of for example a few milliseconds, of course after the engine 1 is started as the vehicle incorporating it is driven.

In this FIG. 6 flow chart, first the transmission control device 45 inputs information from the various sensors 46r/f through 46, and then in the next program step a value for the threshold value deltaNset for the absolute value of the difference deltaN between the rotational speed of the rear vehicle wheels and the rotational speed of the front vehicle wheel is determined according to the current value of the steering angle of the vehicle, according to the FIG. 7 graph: in this exemplary case, said threshold rotational speed difference value is set to a certain positive and non zero basic value when said rotational speed difference is substantially zero (this is done in order positively to prevent the occurrence of winding up torque during vehicle starting off), and increases linearly from said basic value as said rotational speed difference increases from zero. Next, in the next program step, an absolute value is calculated for the difference deltaN between the rotational speed of the rear vehicle wheels and the rotational speed of the front vehicle wheels, and then a decision is made as to whether said rotational speed difference absolute value is greater than the just calculated threshold value deltaNset, or not. If in fact said rotational speed difference absolute value is greater than said threshold value deltaNset, then the flow of control passes through a step which increases the maximum torque transmission capacity Tc of the clutch 21 of the center differential device 10 of the four wheel drive power transfer device 3 by a determinate relatively small amount deltaTc, by appropriately controlling the duty ratio of the pulse electrical signal which is supplied by the transmission control device 45 to the solenoid or the like of the electromagnetically actuated hydraulic switching valve 41, thereby controlling the value of the hydraulic fluid pressure supplied to the chamber 36 of the servo device 35 for said clutch 21; while, on the other hand, if in fact said rotational speed difference absolute value is less than said threshold value deltaNset, then the flow of control passes through a different step which decreases said maximum torque transmission capacity Tc of the clutch 21 of the center differential device 10 of the four wheel drive power transfer device 3 by, in this second preferred embodiment, the same determinate relatively small amount deltaTc, again by appropriately controlling the duty ratio of said pulse electrical signal which is supplied by the transmission control device 45 to the solenoid or the like of the electromagnetically actuated hydraulic switching valve 41. In this second preferred embodiment, further, if said rotational speed difference absolute value is actually equal to said threshold value deltaNset, then the flow of control passes through another yet again different step which does not alter said maximum torque transmission capacity Tc of the clutch 21 of the center differential device 10 of the four wheel drive power transfer device 3. And, by the repeated performance of the FIG. 6 program fragment at regular and relatively brief intervals, the maximum torque transmission capacity Tc of the clutch 21 is relatively quickly brought to a steady state value. The graph of FIG. 7 shows along the vertical axis the magnitude of this threshold value for the value of the difference deltaN between the rotational speed of the rear vehicle wheels and the rotational speed of the front vehicle wheels, and shows along the horizontal axis the magnitude of the steering angle of the vehicle.

In other words, when the absolute value of the difference deltaN between the rotational speed of the rear vehicle wheels and the rotational speed of the front vehicle wheels is not greater than said threshold value deltaNset therefor, which is determined to be greater the greater is the vehicle steering angle but to be positive when said steering angle is substantially zero, then the maximum torque transmitting capacity of the clutch 21 is steadily reduced until it is substantially zero, in other words until said clutch 21 is substantially disengaged. In this operational situation, the center differential device 10 is allowed to substantially freely carry out its differential action, so that the occurrence of the so called tight corner braking phenomenon is avoided, and the occurrence of the screwing up torque phenomenon during starting off of the vehicle from rest is also positively avoided.

On the other hand, when said absolute value of said difference deltaN between the rotational speed of the rear vehicle wheels and the rotational speed of the front vehicle wheels is greater than said threshold value deltaNset thus calculated therefor, then the maximum torque transmitting capacity of the clutch 21 is steadily increased by the amount deltaTc, so that the operation of the center differential device 10 is steadily and progressively more and more restricted by the gradually increasing engagement of the clutch 21. In this operational situation, the center differential device 10 is more and more inhibited from carrying out its differential action, so that it becomes progressively locked up and the operational state of the vehicle progressively approaches the so called direct drive state in which the rotation of the front wheels and the rotation of the rear wheels are directly coupled together. Thereby, along with the difference deltaN between the rotational speed of the rear vehicle wheels and the rotational speed of the front vehicle wheels being progressively diminished, the drive characteristics of the vehicle are progressively improved, and the poor road condition trailblazability of the vehicle is also improved.

As before, it should also be noted that, once the absolute value of the difference deltaN between the rotational speed of the rear vehicle wheels and the rotational speed of the front vehicle wheels rises above the threshold value deltaNset therefor, even when subsequently said absolute value of said difference deltaN between the rotational speed of the rear vehicle wheels and the rotational speed of the front vehicle wheels later drops below said threshold value deltaNset therefor again, the maximum torque transmitting capacity of the clutch 21 is not immediately reduced to zero, but instead said maximum torque transmitting capacity of said clutch 21 is reduced to zero over a certain time period, progressively by successive steps each of magnitude deltaTc. By this means, the occurrence of the so called hunting phenomenon is avoided.

Figure 8:
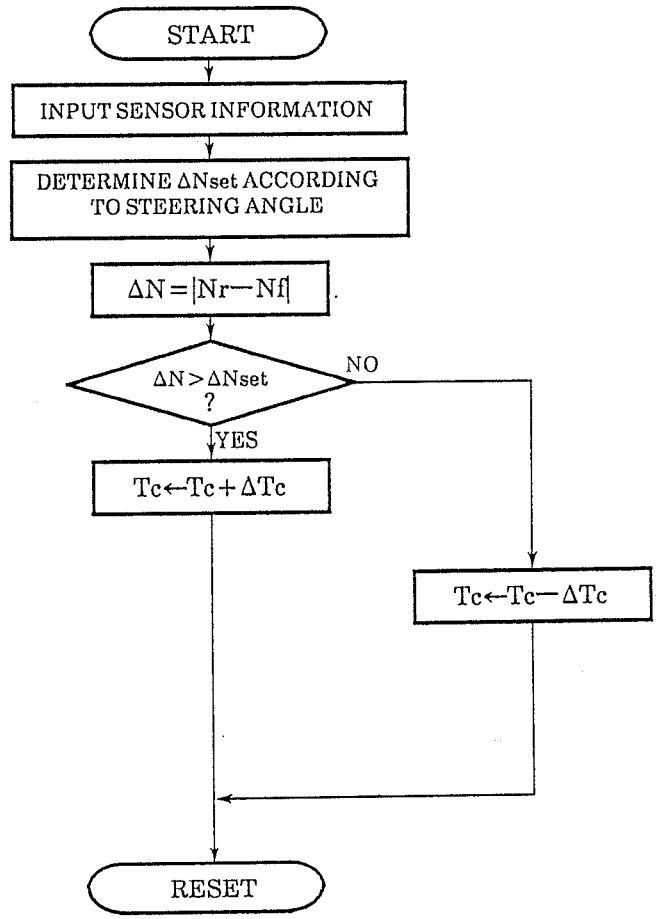
FIG. 8 is similar to FIG. 6 relating to these second preferred device and method embodiments, being a fragmentary flow chart for illustrating an alternative possibility for the program flow thereof.

As a modification of this program fragment, a similar program fragment whose flow chart is shown in FIG. 8 may be utilized. The only difference between the program whose flow chart is shown in FIG. 8 and the program whose flow chart is shown in FIG. 6 is that in FIG. 8 the case of exact equality between deltaN and deltaNset is not catered for, the practicability of which simplification will be clear to one of ordinary skill in the relevant art without undue or further explanation.

The Transmission Control System in the Third Preferred Embodiment

Figure 9:
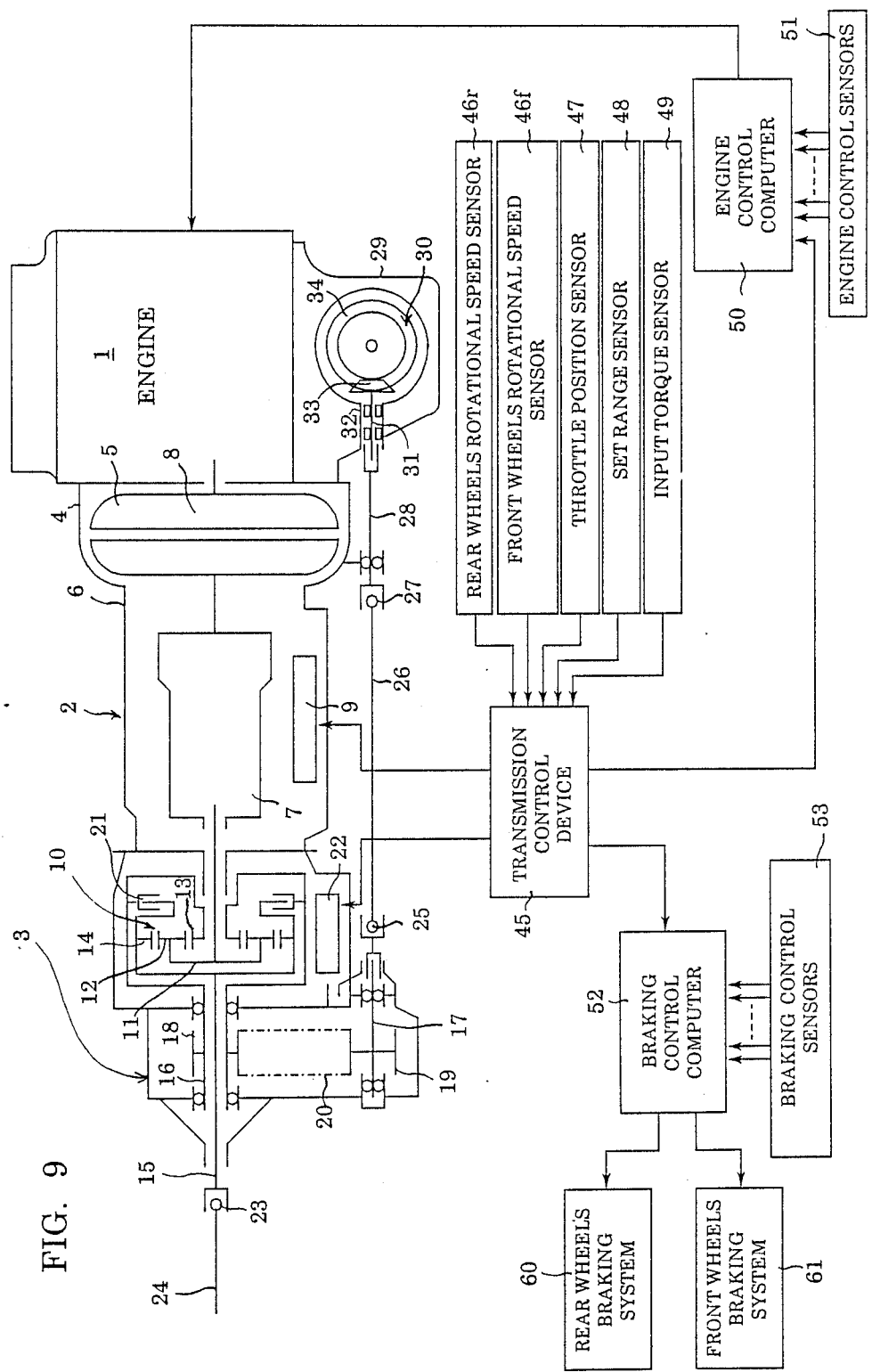
FIG. 9 is similar to FIGS. 1 and 5 relating respectively to the first and second preferred device and method embodiments, being a schematic longitudinal skeleton view of a vehicle power train and of a control system therefor which incorporates the third preferred embodiment of the vehicle central differential operation restriction device control device of the present invention, for practicing the third preferred method embodiment.

Referring now to FIG. 9, which is a figure similar to FIGS. 1 and 5 respectively relating to the first and the second preferred device and method embodiments, and is a schematic longitudinal skeleton view of a vehicle power train (substantially the same as the FIG. 1 and FIG. 5 power trains) and of a control system therefor which incorporates the third preferred embodiment of the vehicle central differential operation restriction device control device of the present invention, for practicing the third preferred method embodiment: it will be seen that the following detectors and sensors are provided to the transmission control system, in this case. A rear wheels rotational speed sensor 46r detects a value representative of the rotational speed of the rear wheels of the vehicle by measuring the rotational speed of a member rotationally coupled to the rear wheel power output shaft 15, or the like, and outputs an electrical signal representative thereof. A front representative of the wheels rotational speed sensor 46f detects a value rotational speed of the front wheels of the vehicle by measuring the rotational speed of a member rotationally coupled to the front wheel power output shaft 17, or the like, and outputs an electrical signal representative thereof. A throttle position sensor 47 detects a value representative of the current load on the internal combustion engine 1 by measuring the opening angle of the throttle valve (not particularly shown) of a carburetor (not shown either) of said engine 1, and outputs an electrical signal representative thereof. A set range sensor 48 detects the set position of a manual range setting valve which is provided for the transmission mechanism 2, or of a setting means therefor, and outputs an electrical signal representative thereof; again, this manual range setting valve is not particularly shown in the figures, but said setting means therefor is provided in the passenger compartment of the vehicle so as to be readily accessible to the driver of the vehicle, and can be set to any one of a number of set positions corresponding to various operational ranges for the transmission mechanism 2 such as "D" range, "2" range, "L" range, "R" range, "N" range, and "P" range. And, in this third preferred embodiment, an input torque sensor 49 senses the input torque (hereinafter designated as "Ti") input to the four wheel drive power transfer device 3 from the automatic speed change device 2, and outputs an electrical signal representative thereof.

This transmission control device 45 outputs control signals for controlling the electric/hydraulic control device 22 for the four wheel drive power transfer device 3 and for controlling the electrical/hydraulic control mechanism 9 for the gear transmission mechanism 7, according to principles which incorporate the concept of the third preferred embodiment of the vehicle central differential operation restriction device control device and method of the present invention, as will now be explained. Further, in the case of these third preferred embodiments, said transmission control device 45 outputs control signals for controlling an engine control computer 50 which receives signals from various engine control sensors collectively designated as 51 and which controls the operation of the internal combustion engine 1 by for example controlling its ignition timing, and the amount of fuel supplied to the combustion chambers thereof and the like, and further outputs other control signals for controlling a braking control computer 52 which receives signals from various braking control sensors collectively designated as 53 and which controls the operation of the rear wheels braking system 60 and of the front wheels braking system 61 of the vehicle - which is independent from said rear wheels braking system 60. It should be understood that, as before, no concrete illustration of the structure of any particular herein, realization of the transmission control device 45 will be given herein, since various possibilities for the details thereof can be easily supplemented by one of ordinary skill in the electronic and computer programming art based upon the functional disclosures set out in this specification. Again, in these third preferred embodiments of the device and the method of the present invention, the transmission control device 45 is concretely realized as a micro computer and its associated circuitry, said micro computer operating at the behest of a control program which will not be completely particularly detailed, since many of the details thereof can likewise be easily supplemented by one of ordinary skill in the electronic and computer programming art based upon the functional disclosures set out in this specification. However, as before, it should be particularly understood that such realizations in the micro computer form, although preferred, are not the only ways in which the transmission control device 45 can be provided; in other possible embodiments it could be constituted as an electrical device not incorporating a microprocessor. In the preferred case, as before, this microprocessor will typically comprise: a CPU (central processing unit) which obeys said control program to be described shortly and which inputs data, performs calculations, and outputs data; a ROM (read only memory) which stores said program to be described shortly and initialization data therefor and so on; and a RAM (random access memory) which stores the results of certain intermediate calculations and data and so on; and these devices together will constitute a logical calculation circuit, being joined together by a common bus which also links them to an input port and an output port which together perform input and output for the system. And the system will typically also include buffers for the electrical signals outputted from the various sensors and switches 46r/f through 49 to the input port device, and drive circuits through which actuating electrical signals are passed from the output port device to a speed change control solenoid or solenoids of the electrical/hydraulic control mechanism 9 for controlling the automatic speed change device 2 and to a control solenoid or the like of the electric/hydraulic control device 22 for controlling the torque transmission capacity of the clutch 21 of the four wheel drive power transfer device 3 by supplying appropriate hydraulic fluid pressure to its pressure chamber 36. It should be understood that, as before, the transmission control device 45 generally functions so as to engage an appropriate one of the various speed stages of the gear transmission mechanism 7 of the transmission mechanism 2 according to the current values of various vehicle operating parameters such as the vehicle road speed as sensed by one or another or both of the rear wheels rotational speed sensor 46r and the front wheels rotational speed sensor 46f, the engine load (throttle opening) as sensed by the throttle position sensor 47, and the operating range of the transmission as manually set by the vehicle driver on the setting means therefor as sensed by the set range sensor 48; such a transmission shift stage selection function may be performed in a per se conventional way, and no particular details thereof will be shown or suggested in this specification, since various possibilities for the details thereof can be easily supplemented as appropriate by one of ordinary skill in the transmission control and the programming arts, particularly when based upon the functional disclosures set out in this specification. Further, said transmission control device 45 generally functions as will now be explained, so as to control the torque transmission capacity of the clutch 21 of the center differential device 10 of the four wheel drive power transfer device 3, according to the current values of the rotational speed of the rear vehicle wheels as sensed by the rear wheels rotational speed sensor 46r and the rotational speed of the front vehicle wheels as sensed by the front wheels rotational speed sensor 46f, and of the input torque Ti input to the four wheel drive power transfer device 3 from the automatic speed change device 2 as sensed by the input torque sensor 49.

The Control According to the Third Method Embodiment

In detail, when the absolute value of the difference deltaN between the rotational speed of the rear vehicle wheels and the rotational speed of the front vehicle wheels is not greater than a certain threshold value deltaNset, then the maximum torque transmission capacity Tc of the clutch 21 of the center differential device 10 of the four wheel drive power transfer device 3 is controlled according to the input torque Ti input to the four wheel drive power transfer device 3 from the automatic speed change device 2 as sensed by the input torque sensor 49; whereas, on the other hand, when said absolute value of the difference deltaN between the rotational speed of the rear vehicle wheels and the rotational speed of the front vehicle wheels is greater than said certain threshold value deltaNset, then it is deemed that one or another set of either the front vehicle wheels or the rear vehicle wheels is slipping with respect to the road or other surface upon which the vehicle is operating, and in this case the maximum torque transmission capacity Tc of the clutch 21 of the center differential device 10 of the four wheel drive power transfer device 3 is increased until the front vehicle wheels and the rear vehicle wheels are directly coupled together or are almost directly coupled together. In other words, at this time, the maximum torque transmission capacity Tc of the clutch 21 of the center differential device 10 of the four wheel drive power transfer device 3 is increased so as to restrict the differential effect provided by said center differential device 10, and the operational condition of the vehicle gradually approaches that condition in which the front vehicle wheels and the rear vehicle wheels are directly coupled together; thereby, the drive characteristics of the vehicle are progressively improved, and the poor road condition trailblazability of the vehicle is also improved.

Figure 10:
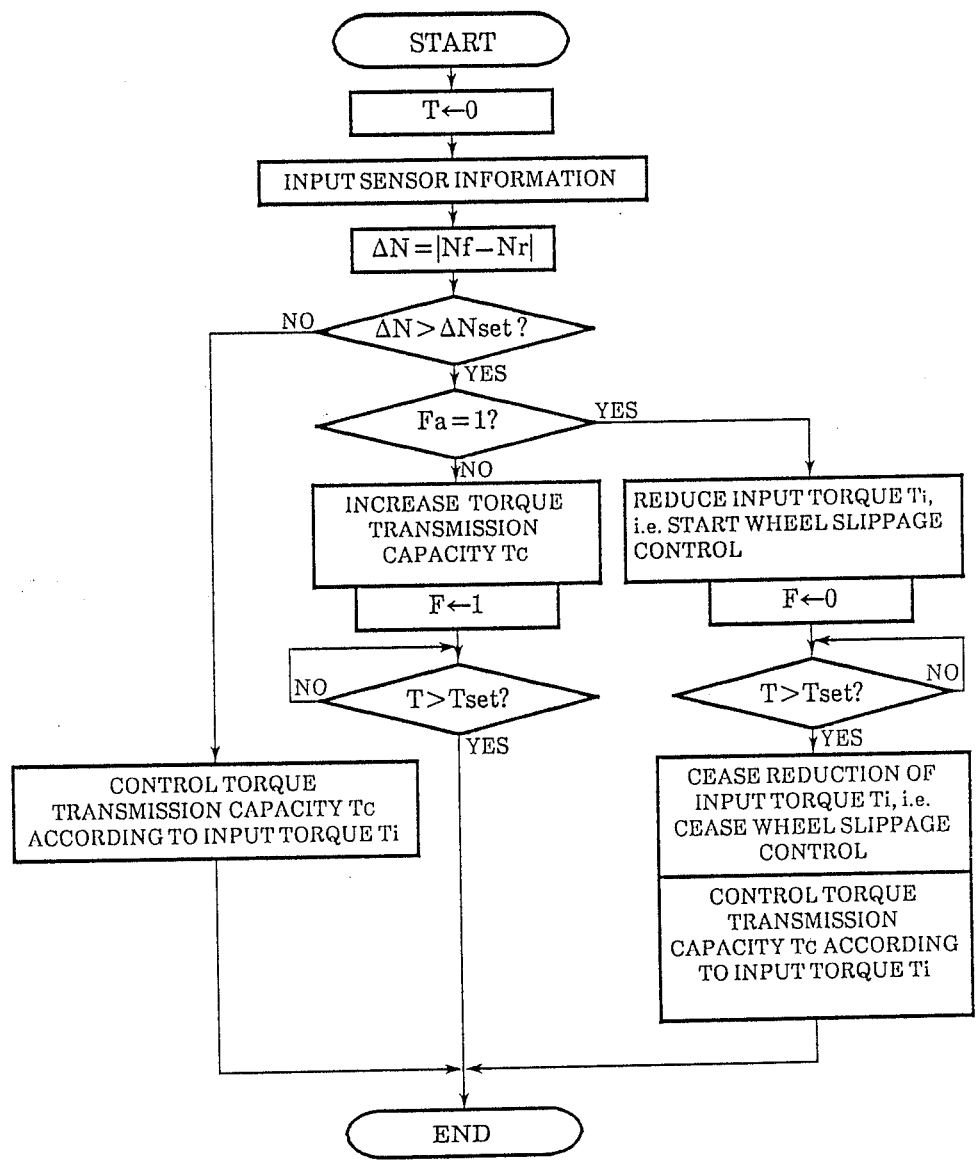
FIG. 10 is similar to FIGS. 3 and 7 respectively relating to the first and the second preferred device and method embodiments, being a fragmentary flow chart for showing the operation of this third preferred method embodiment, illustrating the flow of a program which is obeyed by a transmission control device which is shown by a block in FIG. 9 and is included in this third preferred device embodiment.

FIG. 10 shows a fragmentary flow chart for a portion of the aforementioned control program which directs the operation of the transmission control device 45, according to this third preferred embodiment of the four wheel drive vehicle central differential operation restriction device control device of the present invention, so as to realize the third preferred embodiment of the four wheel drive vehicle central differential operation restriction device control method of the present invention. This flow chart will now be explained; no particular programming steps for implementing said flow chart are shown or suggested in this specification, since various possibilities for the details thereof can be easily supplemented as appropriate by one of ordinary skill in the programming art, particularly when based upon the functional disclosures set out in this specification. The flow chart of FIG. 10 again only shows the portion of the control program of the transmission control device 45 which controls the supply of actuating hydraulic fluid pressure to the clutch 21 of the center differential device 10 of the four wheel drive power transfer device 3, i.e. to the electrically actuated electric/hydraulic control device 22, and further only shows this process in schematic form; said FIG. 10 flow chart therefore does not show the portion of said control program relating to the control provided for the gear transmission mechanism 7 of the transmission mechanism 2. This fragment will be sufficient for exemplifying the principles of the present invention. This program portion is executed at regular intervals of for example a few milliseconds, of course after the engine 1 is started as the vehicle incorporating it is driven.

In this FIG. 10 flow chart, first the transmission control device 45 inputs information from the various sensors 46r/f through 46, and then in the next program step an absolute value is calculated for the difference deltaN between the rotational speed of the rear vehicle wheels and the rotational speed of the front vehicle wheels, and then a decision is made as to whether said rotational speed difference absolute value is greater than a threshold value deltaNset therefor, or not. If in fact said rotational speed difference absolute value is not greater than said threshold value deltaNset, then the flow of control passes through a step which controls the maximum torque transmission capacity Tc of the clutch 21 of the center differential device 10 of the four wheel drive power transfer device 3 according to the input torque Ti input to the four wheel drive power transfer device 3 from the automatic speed change device 2 as sensed by the input torque sensor 49, by appropriately controlling the duty ratio of the pulse electrical signal which is supplied by the transmission control device 45 to the solenoid or the like of the electromagnetically actuated hydraulic switching valve 41, thereby controlling the value of the hydraulic fluid pressure supplied to the chamber 36 of the servo device 35 for said clutch 21; while, on the other hand, if in fact said rotational speed difference absolute value is greater than said threshold value deltaNset, then the flow of control passes to a decision step which tests the value of a flag Fa. If this flag Fa is found to be not set, then the flow of control passes through a step which increases the maximum torque transmission capacity Tc of the clutch 21 of the center differential device 10, and the flag F1 is then set and after waiting for a certain time interval Tset the flow of control exits this routine. On the other hand, if this flag Fa is found to be set, which indicates that the absolute value of the difference deltaN between the rotational speed of the rear vehicle wheels and the rotational speed of the front vehicle wheels has remained greater than the aforesaid threshold value deltaNset for longer than the time interval Tset, then the flow of control passes through a different step which starts to control the engine control computer 50 of FIG. 5 so as to start to decrease the torque which is being output by the internal combustion engine 1 or to shift up the gear transmission mechanism 7 by one or more speed stage or stages, i.e. so as to start to decrease the input torque Ti which is being input to the four wheel drive power transfer device 3 from the automatic speed change device 2; in other words, wheel slippage control is started. Thereby, the slipping of the front vehicle wheels or of the rear vehicle wheels is suppressed or at any rate is substantially reduced. Then, the flag F is reset (turned off), and after waiting for a certain time interval Tset this action is reversed, so that said engine control computer 50 is now controlled so as to cease the reduction of the torque which is being output by the internal combustion engine 1 or to shift down the gear transmission mechanism 7 by one or more speed stage or stages, i.e. so as to cease the reduction of the input torque Ti which is being input to the four wheel drive power transfer device 3 from the automatic speed change device 2; in other words, wheel slippage control is terminated. And finally the flow of control exits this program fragment.

In other words, when the absolute value of the difference deltaN between the rotational speed of the rear vehicle wheels and the rotational speed of the front vehicle wheels is not greater than said threshold value deltaNset therefor, then the maximum torque transmitting capacity of the clutch 21 is controlled according to the input torque Ti which is being input to the four wheel drive power transfer device 3 from the automatic speed change device 2. On the other hand, when said absolute value of said difference deltaN between the rotational speed of the rear vehicle wheels and the rotational speed of the front vehicle wheels is greater than said threshold value deltaNset thus calculated therefor, then the input torque Ti which is being input to the four wheel drive power transfer device 3 from the automatic speed change device 2 is reduced, so as to curb wheel slippage. It should be noted that, alternatively, this second stage type control may be carried out by activating the rear wheels braking system 60 and/or the front wheels braking system 61 of the vehicle, in alternative preferred embodiments, instead of controlling the input torque Ti which is being input to the four wheel drive power transfer device 3 from the automatic speed change device 2. In such a case, the same or similar benefits and advantages are obtained, as with these third preferred device and method embodiments.

The Transmission Control System in the Fourth preferred Embodiment

For the fourth preferred device and method embodiments, no particular schematic longitudinal skeleton view of any vehicle power train or control system therefor will be shown, since the power train of FIG. 5 are suitable for application of these fourth preferred embodiments, also. In this case, too, the control system comprises: a rear wheels rotational speed sensor 46r which detects a value representative of the rotational speed of the rear wheels of the vehicle by measuring the rotational speed of a member rotationally coupled to the rear wheel power output shaft 15, or the like, and which outputs an electrical signal representative thereof; a front wheels rotational speed sensor 46f which detects a value representative of the rotational speed of the front wheels of the vehicle by measuring the rotational speed of a member rotationally coupled to the front wheel power output shaft 17, or the like, and which outputs an electrical signal representative thereof; a throttle position sensor 47 which detects a value representative of the current load on the internal combustion engine 1 by measuring the opening angle of the throttle valve (not particularly shown) of a carburetor (not shown either) of said engine 1, and which outputs an electrical signal representative thereof; a set range sensor 48 which detects the set position of a manula range setting valve which is provided for the transmission mechanism 2, or of a setting means therefor, and which outputs an electrical signal representative thereof; and a steering angle sensor 49 which detects the steering angle of the vehicle, and which outputs an electrical signal representative thereof. The output signals of these five sensors 46r, 46f, 47, 48, and 49 are, as before, fed to the transmission control device 45.

This transmission control device 45 outputs control signals for controlling the electric/hydraulic control device 22 for the four wheel drive power transfer device 3 and for controlling the electrical/hydraulic control mechanism 9 for the gear transmission mechanism 7, according to principles which incorporate the concept of the fourth preferred embodiment of the vehicle central differential operation restriction device control device and method of the present invention, as will now be explained. It should be understood that, as before, no concrete illustration of the structure of any particular realization of the transmission control device 45 will be given herein, since various possibilities for the details thereof can be easily supplemented by one of ordinary skill in the electronic and computer programming art based upon the functional disclosures set out in this specification. Again, in these fourth preferred embodiments of the device and the method of the present invention, the transmission control device 45 is concretely realized as a micro computer and its associated circuitry, said micro computer operating at the behest of a control program which will not be completely particularly detailed, since many of the details thereof can likewise be easily supplemented by one of ordinary skill in the electronic and computer programming art based upon the functional disclosures set out in this specification. However, as before, it should be particularly understood that such realizations in the micro computer form, although preferred, are not the only ways in which the transmission control device 45 can be provided; in other possible embodiments it could be constituted as an electrical device not incorporating a microprocessor. In the preferred case, as before, this microprocessor will typically comprise: a CPU (central processing unit) which obeys said control program to be described shortly and which inputs data, performs calculations, and outputs data; a ROM (read only memory) which stores said program to be described shortly and initialization data therefor and so on; and a RAM (random access memory) which stores the results of certain intermediate calculations and data and so on; and these devices together will constitute a logical calculation circuit, being joined together by a common bus which also links them to an input port and an output port which together perform input and output for the system. And the system will typically also include buffers for the electrical signals outputted from the various sensors and switches 46r/f through 49 to the input port device, and drive circuits through which actuating electrical signals are passed from the output port device to a speed change control solenoid or solenoids of the electrical/hydraulic control mechanism 9 for controlling the automatic speed change device 2 and to a control solenoid or the like of the electric/hydraulic control device 22 for controlling the torque transmission capacity of the clutch 21 of the four wheel drive power transfer device 3 by supplying appropriate hydraulic fluid pressure to its pressure chamber 36. It should be understood that, as before, the transmission control device 45 generally functions so as to engage an appropriate one of the various speed stages of the gear transmission mechanism 7 of the transmission mechanism 2 according to the current values of various vehicle operating parameters such as the vehicle road speed as sensed by one or another or both of the rear wheels rotational speed sensor 46r and the front wheels rotational speed sensor 46f, the engine load (throttle opening) as sensed by the throttle position sensor 47, and the operating range of the transmission as manually set by the vehicle driver on the setting means therefor as sensed by the set range sensor 48; such a transmission shift stage selection function may, as before, be performed in a per se conventional way, and no particular details thereof will be shown or suggested in this specification, since various possibilities for the details thereof can be easily supplemented as appropriate by one of ordinary skill in the transmission control and the programming arts, particularly when based upon the functional disclosures set out in this specification. Further, said transmission control device 45 generally functions as will now be explained, so as to control the torque transmission capacity of the clutch 21 of the center differential device 10 of the four wheel drive power transfer device 3, according to the current values of the rotational speed of the rear vehicle wheels as sensed by the rear wheels rotational speed sensor 46r and the rotational speed of the front vehicle wheels as sensed by the front wheels rotational speed sensor 46f, and of the steering angle of the steering system of the vehicle to which this four wheel drive control system is fitted, as sensed by the steering angle sensor 49.

The Control According to the Fourth Method Embodiment

In detail, when the absolute value of the difference deltaN between the rotational speed of the rear vehicle wheels and the rotational speed of the front vehicle wheels is not greater than a certain threshold value deltaNset, which threshold value deltaNset in the case of this fourth preferred embodiment is determined according to the steering angle of the vehicle and according to the one of the rotational speed Nf of the front wheels of the vehicle and the rotational speed Nr of the rear wheels of the vehicle which currently is the lesser, then the maximum torque transmission capacity Tc of the clutch 21 of the center differential device 10 of the four wheel drive power transfer device 3 is, over a period of time, diminished by successive relatively small steps until it reaches substantially zero; whereas, on the other hand, when said absolute value of the difference deltaN between the rotational speed of the rear vehicle wheels and the rotational speed of the front vehicle wheels is greater than said certain threshold value deltaNset determined as just specified, then the maximum torque transmission capacity Tc of the clutch 21 of the center differential device 10 of the four wheel drive power transfer device 3 is, over a period of time, increased by successive relatively small steps, until its increase naturally curbs said absolute value of the difference deltaN between the rotational speed of the rear vehicle wheels and the rotational speed of the front vehicle wheels. In other word, at this time, a steady state value is reached for said absolute value of the difference deltaN between the rotational speed of the rear vehicle wheels and the rotational speed of the front vehicle wheels, by a feedback process.

Figure 11:
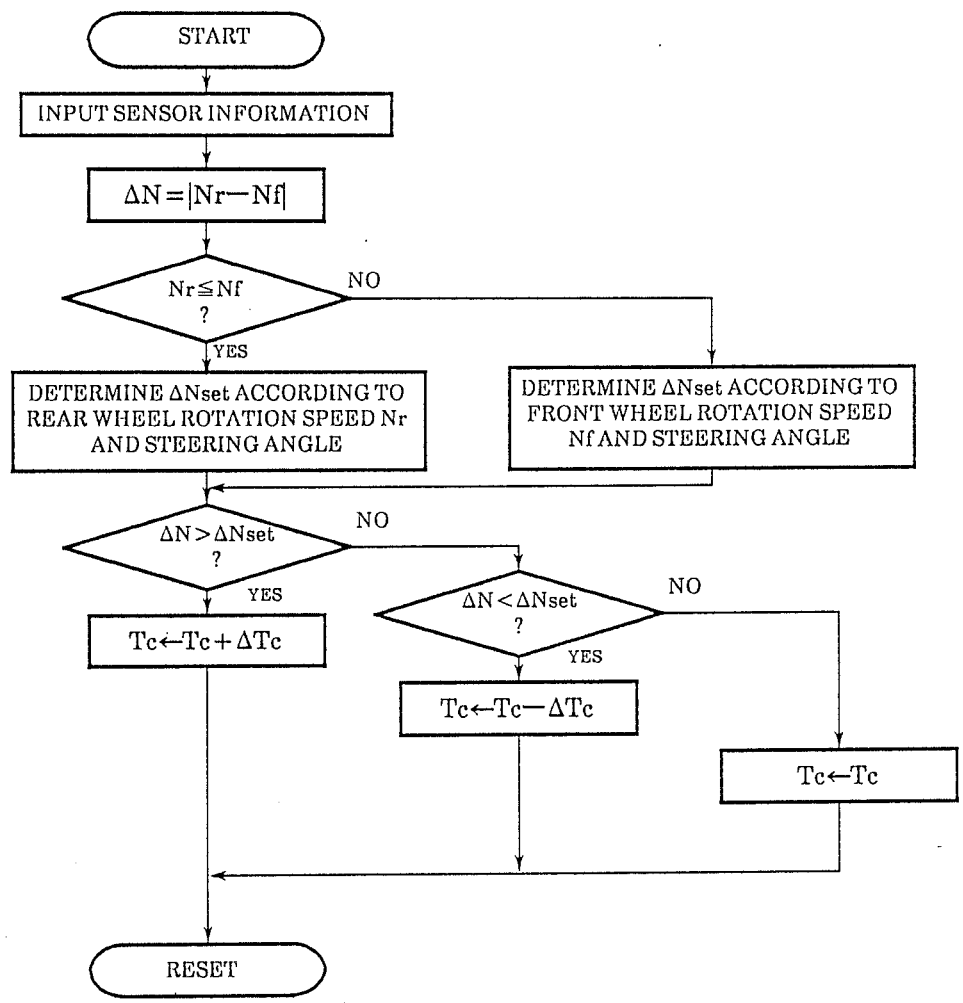
FIG. 11 is similar to FIGS. 3, 7, and 10 respectively relating to the first through the third preferred device and method embodiments, being a fragmentary flow chart for showing the operation of the fourth preferred method embodiment, illustrating the flow of a program which is obeyed by a transmission control device which is included in the fourth preferred device embodiment.

FIG. 11 shows a fragmentary flow chart for a portion of the aforementioned control program which directs the operation of the transmission control device 45, according to this fourth preferred embodiment of the four wheel drive vehicle central differential operation restriction device control device of the present invention, so as to realize the fourth preferred embodiment of the four wheel drive vehicle central differential operation restriction device control method of the present invention. This flow chart will now be explained; again, no particular programming steps for implementing said flow chart are shown or suggested in this specification, since various possibilities for the details thereof can be easily supplemented as appropriate by one of ordinary skill in the programming art, particulary when based upon the functional disclosures set out in this specification. As before, the flow chart of FIG. 11 only shows the portion of the control program of the transmission control device 45 which controls the supply of actuating hydraulic fluid pressure to the clutch 21 of the center differential device 10 of the four wheel drive power transfer device 3, i.e. to the electrically actuated electric/hydraulic control device 22, and further only shows this process in schematic form; said FIG. 11 flow chart therefore does not show the portion of said control program relating to the control provided for the gear transmission mechanism 7 of the transmission mechanism 2. This fragment will be sufficient for exemplifying the principles of the present invention. This program portion is executed at regular intervals of for example a few milliseconds, of course after the engine 1 is started as the vehicle incorporating it is driven.

Figure 12:
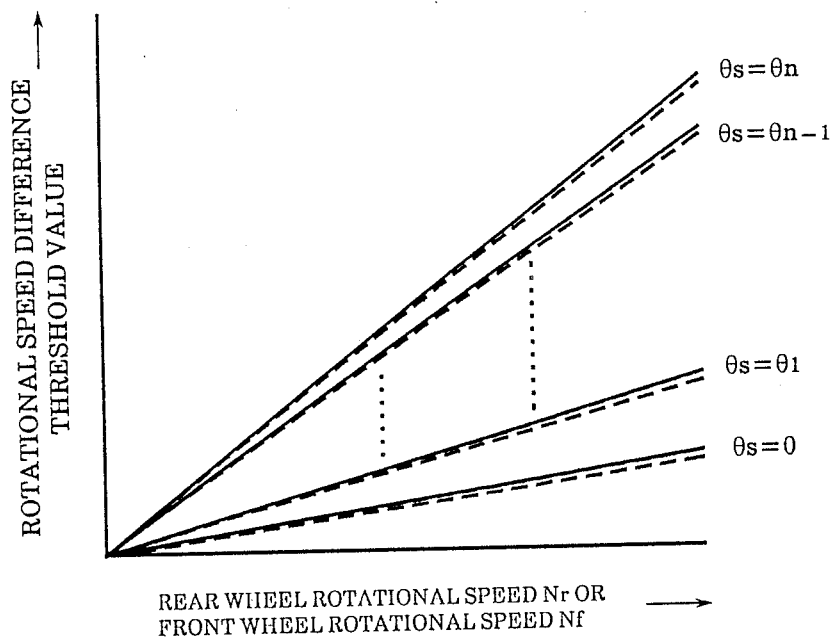
FIG. 12 is a graph for showing an example of the manner in which, in these fourth preferred embodiments, the threshold rotational speed difference value deltaNset, which is shown along the vertical axis, may depend upon the rotational speed Nr of the rear vehicle wheels or the rotational speed Nf of the front vehicle wheels, which is shown along the horizontal axis, for various values of the steering angle of the vehicle (in this graph, the origin does not represent a zero value for said threshold rotational speed difference value deltaNset but on the contrary represents a positive and non zero basic value therefor)

In this FIG. 11 flow chart, first the transmission control device 45 inputs information from the various sensors 46r/f through 46, and then in the next program step an absolute value deltaN is calculated for the difference between the rotational speed of the rear vehicle wheels and the rotational speed of the front vehicle wheels. Then in the next three program steps a value for the threshold value deltaNset for this absolute value deltaN of the difference between the rotational speed of the rear vehicle wheels and the rotational speed of the front vehicle wheels is determined according to the current value of the steering angle of the vehicle, and according to the rotational speed Nr of the rear vehicle wheels and the rotational speed Nf of the front vehicle wheels, in the following manner: if the rotational speed Nr of the rear vehicle wheels is less than the rotational speed Nf of the front vehicle wheels, then the threshold rotational speed difference value deltaNset is determined according to the rotational speed Nr of the rear vehicle wheels and the steering angle, while on the other hand if the rotational speed Nr of the rear vehicle wheels is greater than the rotational speed Nf of the front vehicle wheels, then the threshold rotational speed difference value deltaNset is determined according to the rotational speed Nf of the front vehicle wheels and the steering angle. Now, it is a fact that inevitably the rotational speed Nr of the rear vehicle wheels and the rotational speed Nf of the front vehicle wheels will differ, because of the difference between the rolling radiuses of the respective vehicle wheels, and accordingly it is the lesser of said rotational speed Nr of the rear vehicle wheels and said rotational speed Nf of the front vehicle wheels which is taken as truly indicative of the vehicle road speed, in each particular case. In this exemplary case, the threshold rotational speed difference value deltaNset is set to a certain positive and non zero basic value when the absolute rotational speed difference value deltaN is substantially zero (this is done in order positively to prevent the occurrence of winding up torque during vehicle starting off), and increases linearly from said basic value as said rotational speed difference increases form zero. Next, in the next program step, a decision is made as to whether said rotational speed difference absolute value deltaN is greater than the just calculated threshold value deltaNset, or not. If in fact said rotational speed difference absolute value deltaN is greater than said threshold value deltaNset, then the flow of control passes through a step which increases the maximum torque transmission capacity Tc of the clutch 21 of the center differential device 10 of the four wheel drive power transfer device 3 by a determinate relatively small amount deltaTc, by appropriately controlling the duty ratio of the pulse electrical signal which is supplied by the transmission control device 45 to the solenoid or the like of the electromagnetically actuated hydraulic switching valve 41, thereby controlling the value of the hydraulic fluid pressure supplied to the chamber 36 of the servo device 35 for said clutch 21; while, on the other hand, if in fact said rotational speed difference absolute value deltaN is less than said threshold value deltaNset therefor, then the flow of control passes through a different step which decreases said maximum torque transmission capacity Tc of the clutch 21 of the center differential device 10 of the four wheel drive power transfer device 3 by, in this fourth preferred embodiment, the same determinate relatively small amount deltaTc, again by appropriately controlling the duty ratio of said pulse electrical signal which is supplied by the transmission control device 45 to the solenoid or the like of the electromagnetically actuated hydraulic switching valve 41. In this fourth preferred embodiment, further, if said rotational speed difference absolute value deltaN is actually equal to said threshold value deltaNset, then the flow of control passes through another yet again different step which does not alter said maximum torque transmission capacity Tc of the clutch 21 of the center differential device 10 of the four wheel drive power transfer device 3. And, by the repeated performance of the FIG. 11 program fragment at regular and relatively brife intervals the maximum torque transmission capacity Tc of the clutch 21 is relatively quickly brought to a steady state value. The graph of FIG. 12 shows along the vertical axis the magnitude of this threshold value for the absolute value of the difference deltaN between the rotational speed of the rear vehicle wheels and the rotational speed of the front vehicle wheels and shows along the horizontal axis the magnitude of the steering angle of the vehicle.

In other words, when the absolute value of the difference deltaN between the rotational speed of the rear vehicle wheels and the rotational speed of the front vehicle wheels is not greater than said threshold value deltaNset therefor, which is determined to be greater the greater is the vehicle steering angle but to be positive even when the steering angle is substantially zero, then the maximum torque transmitting capacity of the clutch 21 is steadily reduced until it is substantially zero, in other words until said clutch 21 is substantially disengaged. In this operational situation, the center differential device 10 is allowed to substantially freely carry out its differential action, so that the occurrence of the so called tight corner braking phenomenon is avoided, and the occurrence of the screwing up torque phenomenon during starting off of the vehicle from rest is also positively avoided.

On the other hand, when said absolute value of said difference deltaN between the rotational speed of the rear vehicle wheels and the rotational speed of the front vehicle wheels is greater than said threshold value deltaNset thus calculated therefor, theen the maximum torque transmitting capacity of the clutch 21 is steadily increased by the amount deltaTc, so that the operation of the center differential device gradually increasing engagement of the clutch 21. In this operational situation, the center differential device 10 is more and more inhibited from carrying out its differential action, so that it becomes progressively locked up and the operational state of the vehicle progressively approaches the so called direct drive state in which the rotation of the front wheels and the rotation of the rear wheels are directly coupled together. Thereby, along with the difference deltaN between the rotational speed of the rear vehicle wheels and the rotational speed of the front vehicle wheels being progressively diminished, the drive characteristics of the vehicle are progressively improved, and the poor road condition trailblazability of the vehicle is also improved.

Figure 13:
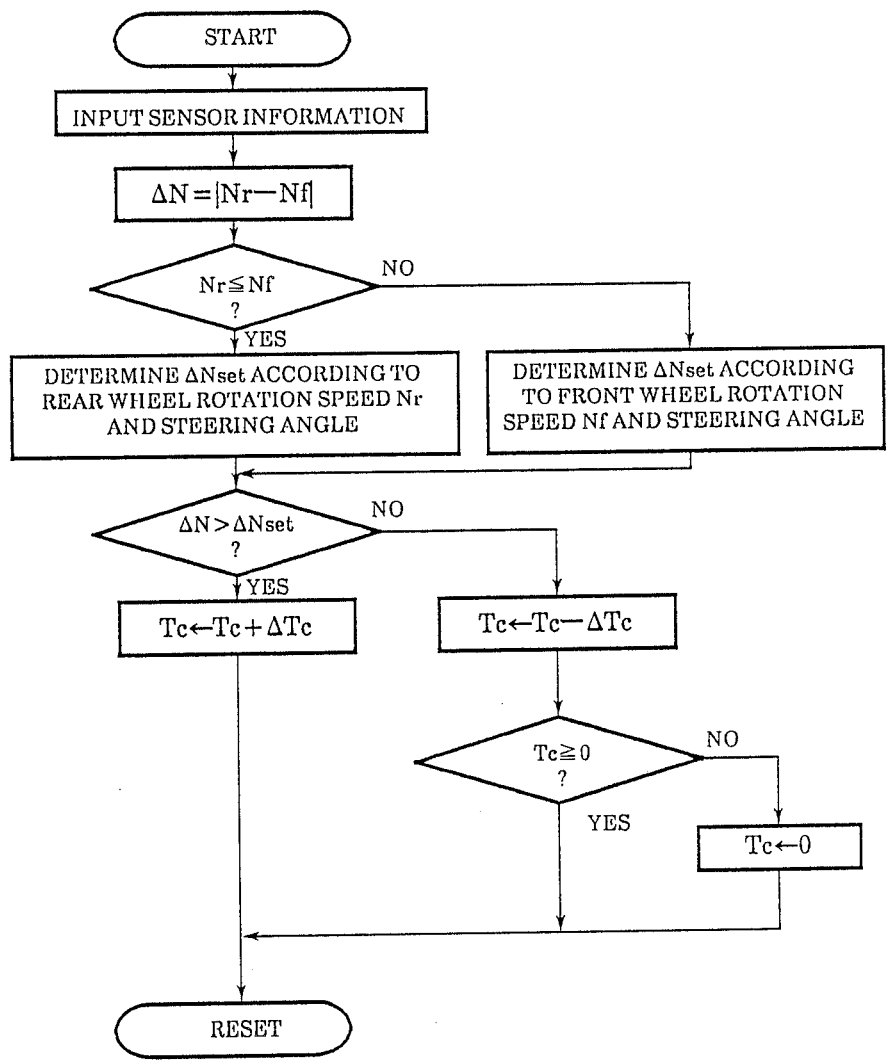
FIG. 13 is similar to FIG. 11 relating to these fourth preferred device and method embodiments, being a fragmentary flow chart for illustrating an alternative possibility for the program flow thereof.

As before, it should also be noted that, once the absolute value of the difference deltaN between the rotational speed of the rear vehicle wheels and the rotational speed of the front vehicle wheels rises above the threshold value deltaNset therefor, even when subsequently said absolute value of said difference deltaN between the rotational speed the rear vehicle wheels and the rotational speed of the front vehicle wheels later drops below said threshold value deltaNset therefor again, the maximum torque transmitting capacity of the clutch 21 is not immediately reduced to zero, but instead said maximum torque transmitting capacity of said clutch 21 is reduced to zero over a certain time period, progressively by successive steps each of magnitude deltaTc. By this means, the occurrence of the so called hunting phenomenon is avoided. As a modification of this program fragment, a similar program fragment whose flow chart is shown in FIG. 13 may be utilized. The only difference between the program whose flow chart is shown in FIG. 8 and the program whose flow chart is shown in FIG. 11 is that in FIG. 13 the case of exact equality between deltaN and deltaNset is not catered for, the practicability of which simplification will be clear to one of ordinary skill in the relevant art without undue or further explanation.

FIG. 13 shows an example of the manner in which the threshold rotational speed difference value deltaNset, which is shown along the vertical axis, may depend upon the rotational speed Nr of the rear vehicle wheels or the rotational speed Nf of the front vehicle wheels, which is shown along the horizontal axis, for various values of the steering angle theta: in this graph, the origin does not represent a zero value for said threshold rotational speed difference value deltaNset, but on the contrary represents a positive and non zero basic value therefor. For each exemplary value of the steering angle theta, the solid line in FIG. 12 shows how the threshold rotational speed difference value deltaNset depends upon the rotational speed Nr of the rear vehicle wheels if said rotational speed Nr of the rear vehicle wheels is less than the rotational speed Nf of the front vehicle wheels, while on the other hand the dashed line shows how said threshold rotational speed difference value deltaNset depends upon said rotational speed Nf of the front vehicle wheels if said rotational speed Nf of the front vehicle wheels is less than the rotational speed Nr of the rear vehicle wheels: thus, these dependencies differ slightly in degree.

Second Overall Vehicle Power Train Structure

Figure 14:
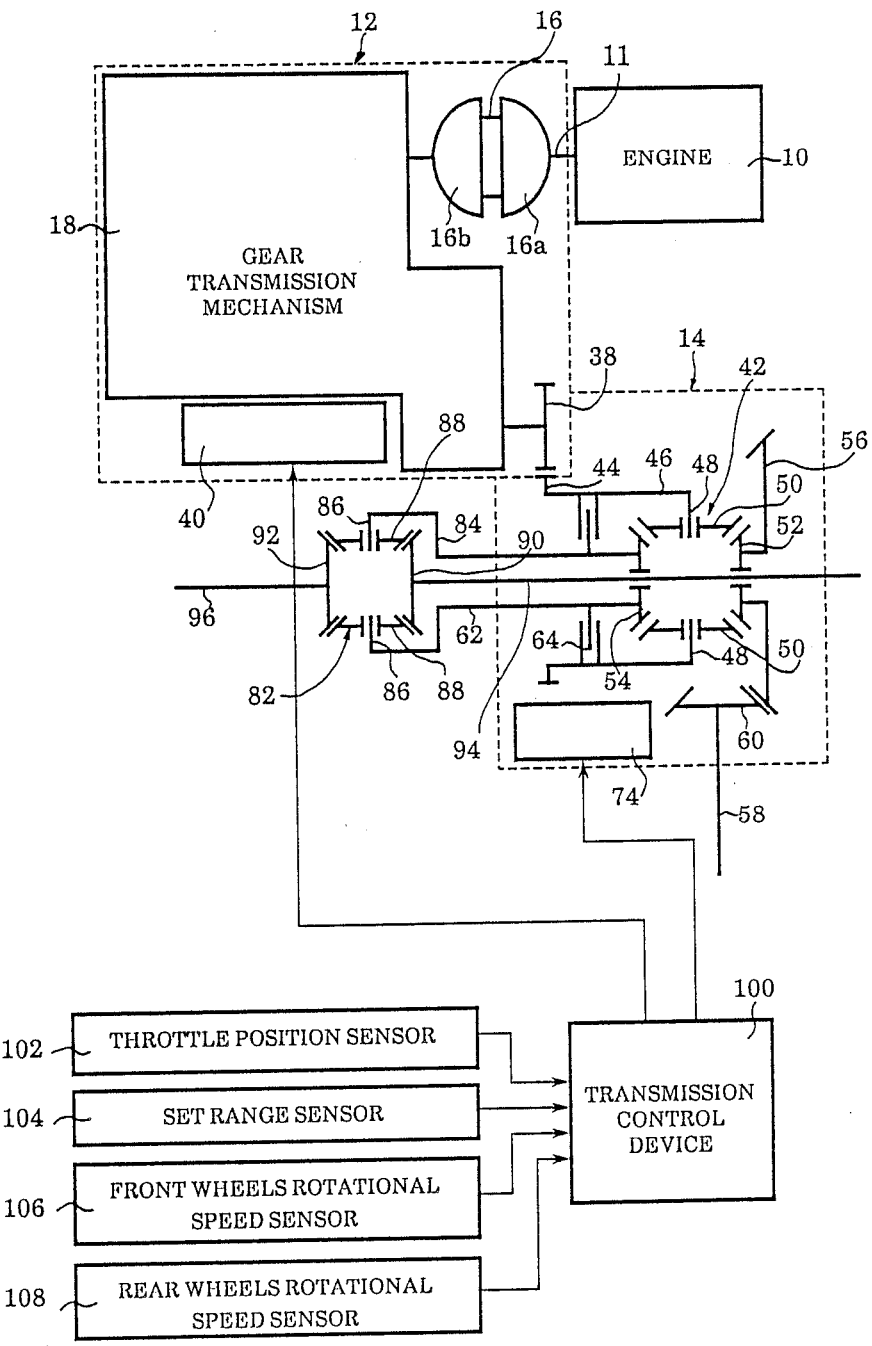
FIG. 14 is a figure similar to FIGS. 1, 5, and 9 relating respectively to the first, the second, and the third preferred device and method embodiments, being a schematic longitudinal skeleton view of a vehicle power train and of a control system therefor which incorporates the fifth preferred embodiment of the vehicle central differential operation restriction device control device of the present invention, for practicing the fifth preferred method embodiment.

FIG. 14 is a schematic longitudinal skeleton view of a power train of a vehicle, which incorporates the fifth preferred embodiment of the control device of the present invention for controlling a four wheel drive vehicle central differential operation restriction device, said control device performing the fifth preferred method embodiment. In this figure, the reference numeral 10 denotes an internal combustion engine of the vehicle, which is mounted, in this second exemplary case, transversely in the front engine room (not particularly shown) of said vehicle. And the reference numeral 12 denotes an automatic speed change device (automatic transmission) of a per se known type mounted to the side, in this case, of the engine 10, while 14 denotes a four wheel drive power transfer device which is always operating in so called full time four wheel drive mode, so as always to drive both the rear pair of wheels of the vehicle and also the front pair of wheels of the vehicle, albeit with the differential action provided by this four wheel drive power transfer device 14 being selectably either not provided at all, being provided to a limited degree, or being fully provided, as will be explained in detail hereinafter.

In more detail, the automatic speed change device 12 incorporates a fluid torque converter 16 of a per se known construction, and the power input member 16a of this fluid torque converter 16 is connected via an input shaft to and receives rotational power from a crank shaft of the internal combustion engine 10. And the fluid torque converter 16 is housed within a torque converter housing which is fitted against and is secured to the main body of the internal combustion engine 10, while the automatic speed change device 12 comprises a gear transmission mechanism 18, which is likewise housed within a speed change device housing fitted against and secured to the torque converter housing. And the input shaft of the gear transmission mechanism 18 is connected to and receives rotational power from the power output member 16b of the fluid torque converter 16; and thereby the gear transmission mechanism 18 receives rotational power from the internal combustion engine 10, with a certain degree of slippage and also torque amplification being provided for said rotational power by the fluid torque converter 16 (unless a lock up clutch thereof, if provided thereto, is activated;

such arrangements are not particularly shown) as is per se conventional. This gear transmission mechanism 18 may for the purposes of this specification be of a per se known type incorporating various planetary gear mechanisms and friction engaging mechanisms such as clutches and brakes, and, according to selective actuation of said friction engaging mechanisms provided in a per se known manner by an electrically controlled electric/hydraulic control mechanism 40 of a per se known sort including various speed change valves and/or solenoids and so on, provides any one of a plurality of speed reduction stages between its said power input shaft and its power output shaft, its said power output shaft driving the four wheel drive power transfer device 14 via a power output gear wheel 38.

This four wheel drive power transfer device 14 incorporates a center differential device 42 of a planetary gear wheel type for providing full time differential action between the front wheels of the vehicle and the rear wheels of the vehicle during the full time four wheel drive operation thereof. Now the detailed construction of this center differential device 42 will be explained. It comprises a differential casing 46 provided integrally with a power input gear wheel 44 which is meshed with the aforementioned power output gear wheel 38 of the gear transmission mechanism 18, and this differential casing supports two differential pinions 50, each by its own pinion shaft 48, in a rotatable and opposing manner. A rear wheel power output gear wheel 52 and a front wheel power output gear wheel 54 are provided, also opposing one another, and each being meshed constantly with both of the differential pinions 50 in a per se known manner. Accordingly, as the power input gear wheel 44 of the center differential device 42 is rotated, the rear wheel power output gear wheel 52 and the front wheel power output gear wheel 54 are driven, with differential action of a per se known type being provided between them, absent the operation of a clutch 64 which will be described shortly.

A rear wheel power output gear wheel 56 is fixedly mounted to the rear wheel power output gear wheel 52, which functions as one power output member for the center differential device 42 for supplying power to the rear wheels of the vehicle, and drives, via a gear wheel 60, a rear wheel power output shaft 58 which extends out of the four wheel drive power transfer device 14 in the direction to the bottom as seen in FIG. 14, i.e. towards the rear of the vehicle in this particular exemplary implementation. The rear end of this rear wheel power output shaft 58 is connected to a differential device, (not particularly shown), for driving the rear wheels (also not shown) of the vehicle. And a hollow sleeve shaped intermediate front wheel drive shaft 62 functions as another power output member for the center differential device 42 for supplying power to the front wheels of the vehicle, and is fixedly connected to the front wheel power output gear wheel 54 and connects it to the differential casing 84 of a front wheel differential device 82. This differential casing 84 of this front wheel differential device 82 supports two differential pinions 88, each by its own pinion shaft 86, in a rotatable and opposing manner. A right side front wheel power output gear wheel 90 and a left side front wheel power output gear wheel 92 are provided, also opposing one another, and each being meshed constantly with both of the differential pinions 88 in a per se known manner. Accordingly, as the sleeve shaped intermediate front wheel drive shaft 62 is rotated by the center differential device 42, the right side front wheel power output gear wheel 90 and the left side front wheel power output gear wheel 92 are driven, with differential action of a per se known type being provided between them. And said right side front wheel power output gear wheel 90 drives the right side front wheel of the vehicle (not shown) via a right side front wheel power output shaft 94 which passes right side through the center differential device 42, while said left side front wheel power output gear wheel 92 drives the left side front wheel of the vehicle (also not shown) via a left side front wheel power output shaft 96.

Within the four wheel drive power transfer device 14 there is provided a hydraulically operated wet type clutch 64, which selectively rotationally connects together the sleeve shaped intermediate front wheel drive shaft 62 and the differential casing 46, either completely or partially, or alternatively allows said members to rotate freely with respect to one another. This wet clutch 64, the construction and the actuation of which will be explained in some detail shortly, is selectively operated to a greater or lesser engagement extent (this expression relates to the maximum torque transmission capability of said wet clutch 64) by supply of actuating hydraulic fluid pressure of a greater or lesser pressure value from an electrically actuated electric/hydraulic control device 74, an exemplary construction for which will be outlined hereinafter. Accordingly, the four wheel drive power transfer device 14, which receives rotational power input from the gear transmission mechanism 18 and outputs said rotational power to the rear wheel power output shaft 58 and to the sleeve shaped intermediate front wheel drive shaft 62, can be caused either to provide (in the case that the wet clutch 64 is fully disengaged) substantially free differential action for distributing said rotational power between said rear wheel power output shaft 58 and said sleeve shaped intermediate front wheel drive shaft 62, or not to provide (in the case that the wet clutch 64 is fully engaged) any such differential action at all and just to drive said shafts 58 and 62 independently, or to provide (in the case that the wet clutch 64 is partially but not fully engaged) a condition intermediate between these two extreme conditions, so as to partly allow the center differential device 42 to provide its differential action for distributing said rotational power between said rear wheel power output shaft 58 and said sleeve shaped intermediate front wheel drive shaft 62 to some extent, while being somewhat impeded by the dragging action of the clutch 64, up to a certain maximum dragging action amount, which is determined by the maximum torque transmission capacity of said wet clutch 64 in the particular operational circumstances.

Operation of this Power Train

This vehicle power train operates as follows. When the clutch 64 of the four wheel drive power transfer device 14 is operated by the electrically actuated electric/hydraulic control device 74 so as not at all to rotationally connect together the intermediate front wheel drive shaft 62 and the transmission casing 46, then the center differential device 42 functions so as to provide its differential effect between the rear wheel power output shaft 58 and the sleeve shaped intermediate front wheel drive shaft 62 in full measure, i.e. so as to receive rotational power provided by the engine 10 of the vehicle and transmitted to said four wheel drive power transfer device 14 via the automatic speed change device 12, and to distribute said rotational power, while providing a non damped differential effect, between the rear wheels of the vehicle taken as a combination and the front wheels of the vehicle taken as a combination. On the other hand, when the clutch 64 of the four wheel drive power transfer device 14 is operated by the electrically actuated electric/hydraulic control device 74 so as to completely rotationally connect together the intermediate front wheel drive shaft 62 and the transmission casing 46, i.e. so as to provide an effectively unlimited degree of torque transmission, then the center differential device 42 functions so as to provide no such differential effect at all between the rear wheel power output shaft 58 and the sleeve shaped intermediate front wheel drive shaft 62, i.e. so as to distribute the rotational power provided from the engine 10 via the automatic speed change device 12 directly to the rear wheels of the vehicle taken as a combination and also to the front wheels of the vehicle taken as a combination in an even fashion without any provision of any differential effect at all between said combinations. And, in the intermediate case between these two extremes, when said clutch 64 of said four wheel drive power transfer device 14 is operated by said electrically actuated electric/hydraulic control device 74 so as somewhat to rotationally connect together said intermediate front wheel drive shaft 62 and said transmission casing 46, i.e. so as to provide a certain relatively limited degree of dragging or torque transmitting effect between these members, then said center differential device 42 functions so as to provide its differential effect between said rear wheel power output shaft 58 and said sleeve shaped intermediate front wheel drive shaft 62 to a relatively limited or partial degree, i.e. so as to receive rotational power provided by said engine 10 of said vehicle and transmitted to said four wheel drive power transfer device 14 via said automatic speed change device 12, and to distribute said rotational power, while providing a partially damped differential effect, between said rear wheels of said vehicle taken as a combination and said front wheels of said vehicle taken as a combination.

The Actuating System for the Clutch 64

The central differential control clutch 64 and its actuating system may be substantially as shown in FIG. 2 with respect to the first preferred embodiments and described above, and hence no particular discussion thereof will be given herein in the interests of brevity of disclosure. The electrically actuated electric/hydraulic control device 74, to define its action in a functional sense, supplies a hydraulic fluid pressure of any desired pressure level from substantially zero up to line pressure to the pressure chamber of the servo device for the clutch 64, according to the value of an electrical control signal supplied to it; this electric signal may be a pulse signal, and the duty ratio of said pulse signal may control the pressure supplied to said pressure chamber of said servo device, for example. Thus, by varying the value of said electrical signal, it is possible to vary the degree of torque transmission between the intermediate front wheel drive shaft 62 and the transmission casing 46 of the center differential device 42 between substantially zero and a substantially maximum value. This controlling pulse electrical signal is supplied from a transmission control device 100, now to be explained.

The Transmission Control System

Referring to FIG. 14, it will be seen that the following detectors and sensors are provided to this system. A rear wheels rotational speed sensor 108 detects a value representative of the rotational speed of the rear wheels of the vehicle by measuring the rotational speed of a member rotationally coupled to the rear wheel power output shaft 58, or the like, and outputs an electrical signal representative thereof. A front wheels rotational speed sensor 106 detects a value representative of the rotational speed of the front wheels of the vehicle by measuring the rotational speed of a member rotationally coupled to the sleeve shaped intermediate front wheel drive shaft 62, or the like, and outputs an electrical signal representative thereof. A throttle position sensor 102 detects a value representative of the current load on the internal combustion engine 10 by measuring the opening angle of the throttle valve (not particularly shown) of a carburetor (not shown either) of said engine 10, and outputs an electrical signal representative thereof. And a set range sensor 104 detects the set position of a manual range setting valve which is provided for the transmission mechanism 12, or of a setting means therefor, and outputs an electrical signal representative thereof; this manual range setting valve is not particularly shown in the figures, but said setting means therefor is provided in the passenger compartment of the vehicle so as to be readily accessible to the driver of the vehicle, and can be set to any one of a number of set positions corresponding to various operational ranges for the transmission mechanism 12 such as "D" range, "12" range, "L" range, "R" range, "N" range, and "P" range. The output signals of these four sensors 108, 106, 102, and 104 are fed to a transmission control device 100.

This transmission control device 100 outputs control signals for controlling the electric/hydraulic control device 74 for the four wheel drive power transfer device 14 and the electrical/hydraulic control mechanism 40 for the gear transmission mechanism 18, according to principles which incorporate the concept of the fifth preferred embodiments of the vehicle central differential operation restriction device control device and method of the present invention, as will be explained hereinafter. No concrete illustration of the structure of any particular realization of the transmission control device 100 will be given herein, since various possibilities for the details thereof can be easily supplemented by one of ordinary skill in the electronic and computer programming art based upon the functional disclosures set out in this specification. In the preferred embodiments of the device and the method of the present invention, the transmission control device 100 is concretely realized as a micro computer and its associated circuitry, said micro computer operating at the behest of a control program which will not be completely detailed, since the details thereof which are not disclosed herein can likewise be easily supplemented by one of ordinary skill in the electronic and computer programming art based upon the functional disclosures set out in this specification. However, it should be particularly understood that such realizations in the micro computer form, although preferred, are not the only ways in which the transmission control device 100 can be provided; in other possible embodiments it could be constituted as an electrical device not incorporating a microprocessor. In the preferred case, however, such a microprocessor will typically comprise: a CPU (central processing unit) which obeys said control program to be described shortly and which inputs data, performs calculations, and outputs data; a ROM (read only memory) which stores said program to be described shortly and initialization data therefor and so on; and a RAM (random access memory) which stores the results of certain intermediate calculations and data and so on; and these devices together will constitute a logical calculation circuit, being joined together by a common bus which also links them to an input port and an output port which together perform input and output for the system. And the system will typically also include buffers for the electrical signals outputted from the various sensors and switches 46 through 104 to the input port device, and drive circuits through which actuating electrical signals are passed from the output port device to a speed change control solenoid or solenoids of the electrical/hydraulic control mechanism 40 for controlling the automatic speed change device 12 and to the solenoid or the like of the electric/hydraulic control device 74 for controlling the torque transmission capacity of the clutch 64 of the four wheel drive power transfer device 14 by supplying appropriate hydraulic fluid pressure to the pressure chamber of the actuator thereof. It should be understood that the transmission control device 100 generally functions so as to engage an appropriate one of the various speed stages of the gear transmission mechanism 18 of the transmission mechanism 12 according to the current values of various vehicle operating parameters such as the vehicle road speed as sensed by one or another or both of the rear wheels rotational speed sensor 108 and the front wheels rotational speed sensor 106, the engine load (throttle opening) as sensed by the throttle position sensor 102, and the operating range of the transmission as manually set by the vehicle driver on the setting means therefor as sensed by the set range sensor 104; such a transmission shift stage selection function may be performed in a per se conventional way, and no particular details thereof will be shown or suggested in this specification, since various possibilities for the details thereof can be easily supplemented as appropriate by one of ordinary skill in the transmission control and the programming arts, particularly when based upon the functional disclosures set out in this specification. Further, said transmission control device 100 generally functions as will now be explained, so as to control the torque transmission capacity of the clutch 64 of the center differential device 42 of the four wheel drive power transfer device 14, according to the current values of the rotational speed of the rear vehicle wheels as sensed by the rear wheels rotational speed sensor 108 and the rotational speed of the front vehicle wheels as sensed by the front wheels rotational speed sensor 106; in particular, according to the difference between said rear and front wheels rotational speeds.

The Control According to the Fifth Method Embodiment

Figure 15:
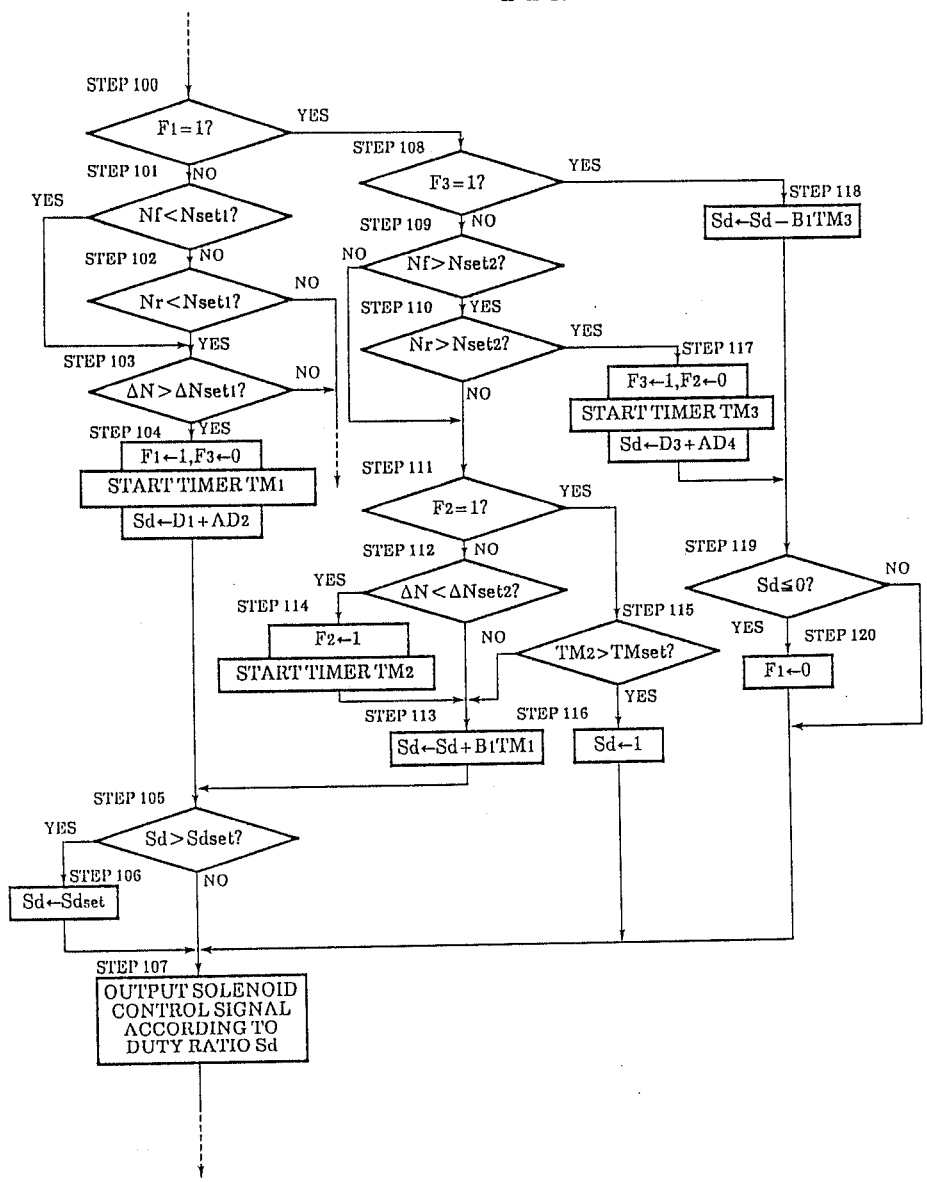
FIG. 15 is similar to various previous figures relating to previously described preferred device and method embodiments, being a fragmentary flow chart for showing the operation of this fifth preferred method embodiment, illustrating the flow of a program which is obeyed by a transmission control device which is shown by a block in FIG. 14 and is included in this fifth preferred device embodiment.

FIG. 15 shows a fragmentary flow chart for a portion of the aforementioned control program which directs the operation of the transmission control device 100, according to this fifth preferred embodiment of the four wheel drive vehicle central differential operation restriction device control device of the present invention, so as to realize the second preferred embodiment of the four wheel drive vehicle central differential operation restriction device control method of the present invention. This flow chart will now be explained; no particular programming steps for implementing said flow chart are shown or suggested in this specification, since various possibilities for the details thereof can be easily supplemented as appropriate by one of ordinary skill in the programming art, particularly when based upon the functional disclosures set out in this specification. The flow chart of FIG. 15 only shows the portion of the control program of the transmission control device 100 which controls the supply of actuating hydraulic fluid pressure to the clutch 64 of the center differential device 42 of the four wheel drive power transfer device 14, i.e. to the electrically actuated electric/hydraulic control device 74, and further only shows this process in schematic form; said FIG. 15 flow chart therefore does not show the portion of said control program relating to the control provided for the gear transmission mechanism 18 of the transmission mechanism 12. This fragment will be sufficient for exemplifying the principles of the present invention. This program portion is executed at regular intervals of for example a few milliseconds, of course after the engine 10 is started as the vehicle incorporating it is driven.

In this flow chart, first, in the step 100, a test is made as to whether or not the current value of a flag F1 is 1. The flag F1 is a flag which indicates, when a vehicle wheel is slipping, that torque transmission capacity increase control is being carried out, and, when in fact the current value of the flag F1 is 1, the flow of control passes next to the step 108, whereas when on the other hand the current value of the flag F1 is not 1 the flow of control passes next to the step 101.

In the step 101, a test is made as to whether or not the current value of the front wheels rotational speed Nf is smaller than a predetermined value Nset1. The set value Nset1 is an extremely small value close to 0, and, when the current value of Nf is less than Nset1, the flow of control passes next to the step 103, whereas, when current value of Nf is not less than Nset1, the flow of control passes next to the step 102.

In the step 102, a test is made as to whether or not the current value of the rear wheels rotational speed Nr is smaller than the set value Nset1. If the current value of Nr is in fact less than Nset1, the flow of control passes next to the step 103, whereas, if the current value of Nr is not less than Nset1, the flow of control proceeds out of this program fragment to another program stage not particularly shown. At this point setting of the duty ratio Sd of the solenoid of the electrically actuated electric/hydraulic control device 74 is carried according to various other conditions.

The step 103 is executed when at least one of the rear wheels rotational speed Nr and the front wheels rotational speed Nf is not more than the present value Nset1, and, in this step 103, a test is made as to whether or not the rotational speed difference deltaN between the rear wheels rotational speed Nr and the front wheels rotational speed Nf is greater than a predetermined set value deltaNset1. The value deltaNset1 is set in advance to be a relatively small value, for example 50 r.p.m., and, when deltaN is greater than deltaNset1, a decision is made that one at least of the front wheels or one at least of the rear wheels is slipping with respect to the road surface, and in this case the flow of control proceeds to the step 104; whereas, when deltaN is not greater than deltaNset1, a decision is made that none of either the front wheels or the rear wheels are slipping with respect to the road surface, and the flow of control proceeds, as before, out of this program fragment to another program stage not particularly shown. At this point setting of the duty ratio Sd of the solenoid of the electrically actuated electric/hydraulic control device 74 is carried according to various other conditions.

The step 104 is executed when at least one of the front wheels rotational speed Nf and the rear wheels rotational speed Nr is not more than the predetermined value Nset1, and the rotational speed difference between the front and rear wheels deltaN is not less than the predetermined value deltaNset1, in other words when the conditions for torque transmission capacity increase are being met. In this step 104, the value of the flag F1 is set to 1, the value of a flag F3 which indicates that torque transmission capacity increase is not active is set to 0, a timer TM1 is started, and the duty ratio Sd of the signal being sent by the transmission control device 100 to the solenoid or the like incorporated in the electrically actuated electric/hydraulic control device 74 is set to D1+AD2. The value D1 is a fixed value, and the value AD2 is a throttle opening proportionality value which is set to a value depending on the throttle opening which is larger when the throttle opening is larger. Therefore the solenoid control signal duty ratio Sd is a value which is larger when the throttle opening is large. After the step 104, the flow of control passes next to the step 105.

In the step 105, a test is made as to whether or not the duty ratio value of the solenoid control signal Sd is greater than a predetermined value Sdset. When the duty ratio value of the signal Sd is not greater than Sdset, the flow of control passes directly to the step 107, whereas, when the duty ratio value of the solenoid control signal Sd is greater than Sdset, the flow of control proceeds to the step 106.

In the step 106, the duty ratio Sd of the solenoid control signal is set to the set value Sdset, and next the flow of control passes next to the step 107.

In the step 107, a solenoid control signal with the duty ratio value Sd is output to the solenoid incorporated in the electrically actuated electric/hydraulic control device 74 which controls the supply of hydraulic fluid pressure to the servo chamber of the clutch 62.

The step 108 is executed after the beginning of torque transmission capacity increase control, and, in this step 108, a test is made as to whether or not the current value of the flag F3 is 1. The flag F3 is a flag showing that torque transmission capacity increase control is not in effect, and, when the current value of said flag F3 is in fact 1, in order to continue not applying the torque transmission capacity increase control, the flow of control proceeds to the step 118, whereas when the current value of said flag F3 is in fact not 1, the flow of control passes next to the step 109.

In the step 109, a test is made as to whether or not the front wheels rotational speed Nf is greater than a predetermined value Nset2. The set value Nset2 is set to be sufficiently larger than the other set value Nset1, and, when Nf is greater than Nset2, the flow of control passes next to the step 110, whereas, when Nf is not greater than Nset2, the flow of control proceeds to the step 111.

In the step 110, a test is made as to whether or not the rear wheels rotational speed Nr is greater than the set value Nset2. If Nr is greater than Nset2, the flow of control proceeds to the step 117, whereas, if Nr is not greater than Nset2, the flow of control proceeds to 111.

The step 111 is executed when one of the front wheels rotational speed Nf and the rear wheels rotational speed Nr is less than the value Nset2, and the conditions for stopping the application of torque transmission capacity increase control are not being met, and, in this step 111, a test is made as to whether or not the current value of a flag F2 is 1. This flag F2 is a flag which indicates the completion of torque transmission capacity increase control, and, when the current value of the flag F2 is 1, the flow of control passes next to the step 115, whereas, when the current value of the flag F2 is not equal to 1, the flow of control passes next to the step 112.

In the step 112, a test is made as to whether or not the rotational speed difference deltaN between the front wheels rotational speed Nf and the rear wheels rotational speed Nr is not more than a certain value deltaNset2. The value deltaNset2 is set to be an extremely small value such as for example 5 r.p.m., and when deltaN is less than deltaNset2, the flow of control proceeds to the step 114, whereas when deltaN is not less than deltaNset2, the flow of control passes next to the step 113.

In the step 113, the duty ratio Sd of the solenoid control signal is gradually increased with the passage of time by Sd+B1.TM1. After this step 113, the flow of control passes next to the step 105.

In the step 114, the current value of the flag F2 is set to 1, and the timer TM2 is started. After this step 114, the flow of control passes next to the step 113.

In the step 115, a test is made as to whether the current counted value of the timer TM2 is at least a predetermined timer set value TMset, which may for example corresponding to a time interval of approximately 0.5 seconds. If the current counted value of the timer TM2 is greater than TMset, then the flow of control passes next to the step 116, whereas, if the current counted value of the timer TM2 is not greater than TMset, the flow of control passes next to the step 113.

In the step 116, the duty ratio Sd of the solenoid control signal is set to 1 (100%). After this step 116, the flow of control passes next to the step 107.

Figure 16:
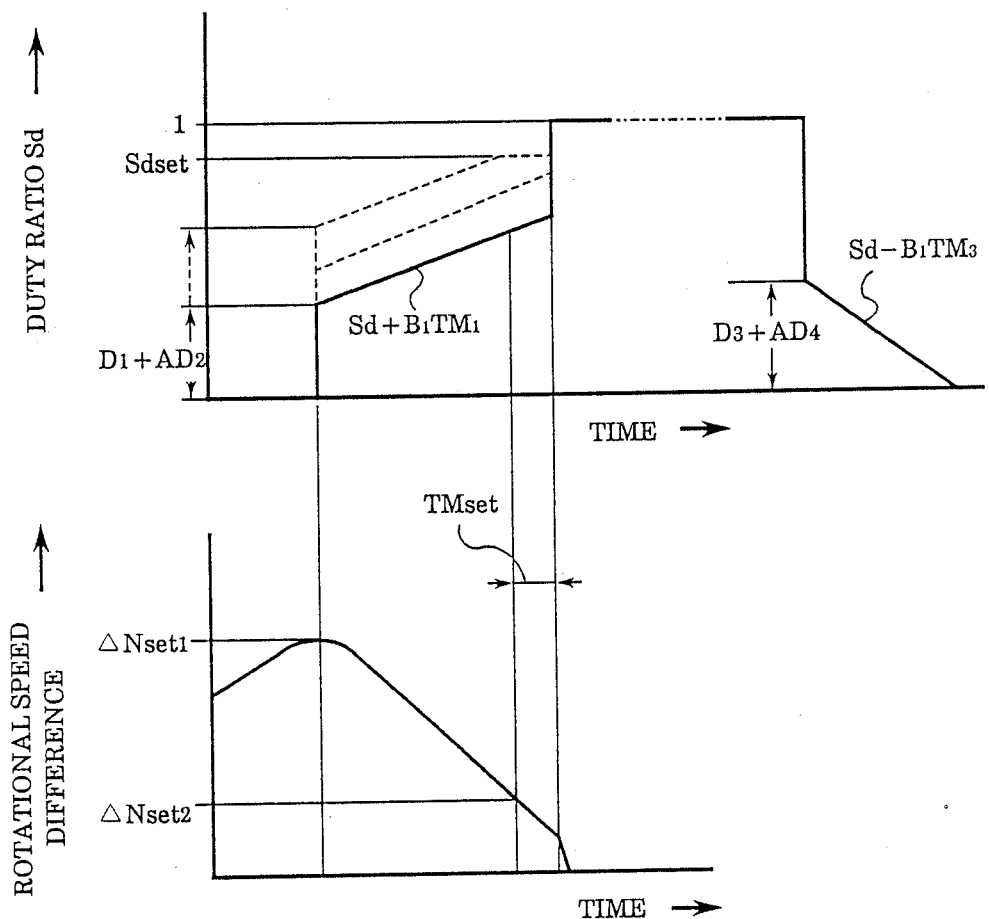
FIG. 16 is a time chart relating to the operation of these fifth preferred embodiments, in which time is shown along the horizontal direction and the absolute value of the difference between the rotational speed of the rear vehicle wheels and the rotational speed of the front vehicle wheels and also the duty ratio of a pulse electrical signal are both shown along the vertical direction.

Thereby, during this torque transmission capacity increase control, the duty ratio Sd is, as shown in FIG. 16 which is a time chart relating to the operation of these fifth preferred embodiments in which time is shown along the horizontal direction and the absolute value of the difference deltaN between the rotational speed Nr of the rear vehicle wheels and the rotational speed Nf of the front vehicle wheels and also the duty ratio Sd are both shown along the vertical direction, first increased rapidly with the beginning of the flow of control by D1+AD2, after which it is increased gradually with time by Sd+B1.TM1, and, when the duty ratio Sd would become at least a certain value Sdset, it is maintained at that certain value Sdset, and, after the rotational speed difference between the front and rear wheels deltaN has become not more than a certain value deltaNset2, and then a time determined by a timer set value TMset has elapsed, the duty ratio Sd is set to its maximum value of 1. Since the solenoid control signal determined by this duty ratio Sd is supplied to the electrically actuated electric/hydraulic control device 74 which controls the clutch 64, the engagement amount of said clutch 64, or in other words the maximum torque transmission capacity thereof, increases with similar characteristics to the duty ratio characteristics shown in FIG. 16.

The step 117 is executed when both of the front wheels rotational speed Nf and the rear wheels rotational speed Nr are at least the value Nset2, in other words when the conditions for stopping this mode of control hold, and, in this step 117, the value of the flag F3 is set to 1, the value of the flag F2 is set to 0, a timer TM3 is started, and then the duty ratio Sd of the solenoid control signal is set to D3+AD4. After this step 117, the flow of control passes next to the step 119.

The step 118 is executed when the current value of the flag F3 is equal to 1, or in other words when the conditions for stopping this mode of control already hold, and, in this step 118, the solenoid control signal duty ratio Sd is reduced with the passage of time by Sd− B1.TM3. After this step 118, the flow of control passes next to the step 119.

In the step 119, a test is made as to whether or not the duty ratio Sd of the solenoid control signal is zero or a value not substantially greater than zero. If Sd is less than or equal to zero, the flow of control passes next to the step 120, and in this step 120 the value of the flag F1 is set to zero. After this step 120, the flow of control passes next to the step 107.

Thus, when the torque transmission capacity increase control is stopped, with the beginning thereof the duty ratio Sd of the solenoid control signal suddenly decreases, as shown in FIG. 16, by D3+AD4, and thereafter is reduced gradually with the passage of time by Sd−B1.TM3, and accordingly the torque transmission capacity of the differential control clutch 64 is reduced.

By carrying out control according to the above described flowchart, when either of the rear wheel rotational speed Nr or the front wheel rotational speed Nf is not more than a certain value and also the rotational speed difference between the front and rear wheels is at least a certain value, then thereafter provided only that neither of the rear wheel rotational speed Nr or the front wheel rotational speed Nf increases so far as to exceed a certain value, the engagement pressure, that is to say the torque transmission capacity, of the differential control clutch 64 is increased, and the differential effect of the center differential device 42 is restricted, and, when both of the rear wheel rotation speed Nr and the front wheel rotation speed Nf have increased to exceed a certain value, the engagement pressure, that is to say the torque transmission capacity, of the differential control clutch 64 is reduced, and the restriction of the differential effect of the center differential device 42 is abolished.

Conclusion

It is acceptable, according to the principle of the present invention if the constructional details of the system are varied, although the shown ones are considered to be preferred. For example, the friction engaging device for providing torque distribution between the pair of front wheels of the vehicle and the pair of rear wheels of the vehicle could, in other embodiments, be a clutch provided in the power transmission path either to the pair of front vehicle wheels or to the pair of rear vehicle wheels and restricting or the flow of controlling the amount of torque supplied to its pair of vehicle wheels, rather than being a central differential control clutch like the clutches 21 and 64 of the shown preferred embodiments. Other modifications could also be conceived of. For example, although the comparison between the rotational speed of the rear vehicle wheels and the rotational speed of the front vehicle wheels was, in all the above described preferred embodiments, defined by the difference between said rotational speeds, equally well the ratio of said rotational speeds could be taken. Therefore, although the present invention has been shown and described in terms of the preferred embodiments of the device and of the method thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. In a four wheel drive vehicle with an engine, a front wheel propeller shaft, a rear wheel propeller shaft, a central differential device for differentially transmitting rotational power from said engine to said front wheel propeller shaft and said rear wheel propeller shaft, a front wheels rotational speed sensor for detecting a rotational speed of a combination of front wheels of the vehicle, a rear wheels rotational speed sensor for detecting a rotational speed of a combination of rear wheels of the vehicle, and a central differential operation restricting device for selectively restricting the differential operation of said central differential device at variable degrees:

a method for controlling said central differential operation restricting device, comprising the steps of:
(a) detecting the rotational speed of the front wheels and the rotational speed of the rear wheels of the vehicle by said front wheels rotational speed sensor and said rear wheels rotational speed sensor, respectively, to produce a first variable value and a second variable value corresponding to the rotational speed of said front wheels and said rear wheels respectively;
(b) comparing said first variable value with said second variable value to produce a third variable value which is the absolute value of the difference between said first and second variable values;
(c) comparing said third variable value with a reference value to detect a first condition that said third variable value is larger than said reference value and a second condition that said third variable value is smaller than said reference value;
(d) increasing the degree of the differential operation restricting operation of said central differential operation restricting device for an increment thereof when said first condition is detected; and
(e) decreasing the degree of the differential operation restricting operation of said central differential operation restricting device when said second condition is detected;
(f) comparing said first variable value with said second variable value to detect a first sub-condition that said first variable value is larger than said second variable value and a second sub-condition that said first variable value is not larger than said second variable value, wherein said reference value is modified according to said second variable value when said first sub-condition is being detected, while said reference value is modified according to said first variable value when said second sub-condition is being detected;

wherein said steps (a), (b), (c) and (d) are repetitively performed in said sequence as long as said first condition is being detected and said steps (a), (b), (c) and (e) are performed when said second condition is detected.

2. A method according to claim 1, wherein in step (e) the degree of the differential operation restricting operation of said central differential operation restricting device is decreased for an increment thereof when said second condition is detected, and said steps (a), (b), (c) and (e) are repetitively performed in said sequence as long as said second condition is being detected.

3. A method according to claim 1, wherein the vehicle further comprises a steering angle sensor for detecting a steering angle of the vehicle, and said reference value is increased according to an increase of the steering angle detected by said steering angle sensor.

4. A method according to claim 1, wherein said steps (a), (b) and (c) are repetitively sequentially performed, while omitting steps (d) and (e) and maintaining the degree of the differential operation restricting operation of said central differential operation restricting device at a current value thereof as long as neither said first condition nor said second condition is being detected.

5. A method according to claim 1, wherein said reference value is increased according to an increase of one of said first variable value and said second variable value according to which of said first and second variable values said reference value is modified.

6. A method according to claim 2, wherein said reference value is provided in plurality to include a first reference value and a second reference value smaller than said first reference value, and when said first and second variable values are detected to be less than a relatively low first critical value indicating substantial stoppage of the vehicle, said increment for increasing the degree of the differential operation restricting operation of said central differential operation restricting device is changed from zero to a relatively large initial value to be used when it is first detected that said third variable value is larger than said first reference value, then to a moderate medium value to be used subsequent to said initial value until a predetermined short time lapses from a time point when said third variable value decreases to said second reference value, then to a relatively large final value to be used when said predetermined short time has lapsed, and then to zero until said first and second variable values are detected to be larger than a relatively large second critical value indicating normal running of the vehicle, and when said first and second variable values are detected to be larger than said second critical value, said increment for decreasing the degree of the differential operation restricting operation of said central differential operation restricting device is changed from zero to a relatively large initial value, and then to a moderate medium value until said central differential operation restricting device is completely released.

7. In a four wheel drive vehicle with an engine, a front wheel propeller shaft, a rear wheel propeller shaft, a central differential device for differentially transmitting rotational power from said engine to said front wheel propeller shaft and said rear wheel propeller shaft, a front wheels rotational speed sensor for detecting a rotational speed of a combination of front wheels of the vehicle to produce a first variable value corresponding to the value detected thereby, a rear wheels rotational speed sensor for detecting a rotational speed of a combination of rear wheels of the vehicle to produce a second variable value corresponding to the value detected thereby, and a central differential operation restricting device for selectively restricting the differential operation of said central differential device at variable degrees:

a system for controlling said central differential operation restricting device, comprising:

a first comparison means for comparing said first variable value with said second variable value to produce a third variable value which is the absolute value of the difference between said first and second variable values;

a second comparison means for comparing said third variable value with a reference value to detect a first condition that said third variable value is larger than said reference value and a second condition that said third variable value is smaller than said reference value;

a first sub-control means for increasing the degree of the differential operation restricting operation of said central differential operation restricting device for an increment thereof when said first condition is detected;

a second sub-control means for decreasing the degree of the differential operation restricting operation of said central differential operation restricting device when said second condition is detected;

a third comparison means for comparing said first variable value with said second variable value to detect a first sub-condition that said first variable value is larger than said second variable value and a second sub-condition that said first variable value is not larger than said second variable value, and a means for modifying said reference value, wherein said means for modifying said reference value modifies said reference value according to said second variable value when said first sub-condition is being detected and modifies said reference value according to said first variable value when said second sub-condition is being detected; and an overall means for repetitively operating said first comparison means, said second comparison means and said first sub-control means in sequence as long as said first condition is being detected and for operating said second sub-control means when said second condition is detected.

8. A system according to claim 7, wherein said second sub-control means decreases the degree of the differential operation restricting operation of said central differential operation restricting device for an increment thereof when said second condition is detected and said overall control means repetitively operates said first comparison means, said second comparison means and said second sub-control means in sequence as long as said second condition is being detected.

9. A system according to claim 7, further comprising a steering angle sensor for detecting a steering angle of the vehicle, and a means for modifying said reference value so as to increase said reference value according to an increase of the steering angle detected by said steering angle sensor.

10. A system according to claim 7, further comprising a third sub-control means for maintaining the degree of the differential operation restricting operation of said central differential operation restricting device at a current value thereof as long as neither said first condition nor said second condition is being detected by said second comparison means.

11. A system according to claim 7, wherein said means for modifying said reference value increases said reference value according to an increase of one of said first variable value and said second variable value according to which of said first and second variable values said reference value is modified.

12. A system according to claim 7, further comprising a third comparison means for comparing said first and second variable values with a relatively low first critical value indicating substantial stoppage of the vehicle, a fourth comparison means for comparing said first and second variable values with a relatively high second critical value indicating normal running of the vehicle, and a means for modifying said reference value, and when said first and second variable values are detected to be less than said first critical value, said first sub-control means increases said increment for increasing the degree of the differential operation restricting operation of said central differential operation restricting device from zero to a relatively large initial value to be used when it is first detected that said third variable value is larger than a first value for said reference value, then to a moderate medium value to be used subsequent to said initial value until a predetermined short time lapses from a time point when said third variable value decreases to a second value for said reference value smaller than said first value therefor, then to a relatively large final value to be used when said predetermined short time has lapsed, and then to zero until said first and second variable values are detected to be larger than said second critical value, and when said first and second values are detected to be larger than said second critical value, and said second sub-control means increases said increment for decreasing the degree of the differential operation restricting operation of said central differential operation restricting device from zero to a relatively large initial value, and then to a moderate medium value until said central differential operation restricting device is completely released.

* * * * *